(12) United States Patent
Tsuge et al.

(10) Patent No.: US 7,267,113 B2
(45) Date of Patent: Sep. 11, 2007

(54) FLUID CONTROL VALVE

(75) Inventors: Shigeto Tsuge, Okazaki (JP); Yasuo Kato, Niwa-gun (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 73 days.

(21) Appl. No.: 11/356,186

(22) Filed: Feb. 17, 2006

(65) Prior Publication Data

US 2006/0185652 A1    Aug. 24, 2006

(30) Foreign Application Priority Data

Feb. 18, 2005 (JP) ............................. 2005-042489
Nov. 30, 2005 (JP) ............................. 2005-345032

(51) Int. Cl.
*F02M 33/02* (2006.01)
*B32B 9/00* (2006.01)
(52) U.S. Cl. ...................... 123/520; 428/408
(58) Field of Classification Search ............... 123/516, 123/518–520
See application file for complete search history.

(56) References Cited

U.S. PATENT DOCUMENTS

| | | | | |
|---|---|---|---|---|
| 4,986,246 A | * | 1/1991 | Kessler de Vivie et al. | 123/520 |
| 5,226,397 A | * | 7/1993 | Zabeck et al. | 123/516 |
| 5,230,931 A | * | 7/1993 | Yamazaki et al. | 427/569 |
| 5,618,619 A | * | 4/1997 | Petrmichl et al. | 428/334 |
| 5,740,941 A | * | 4/1998 | Lemelson | 220/62.15 |
| 5,985,451 A | * | 11/1999 | Senda et al. | 428/408 |
| 6,526,951 B2 | | 3/2003 | Ishigaki et al. | |
| 6,893,720 B1 | * | 5/2005 | Nakahigashi et al. | 428/408 |
| 7,134,381 B2 | * | 11/2006 | Ueno et al. | 92/71 |
| 7,146,956 B2 | * | 12/2006 | Nomura et al. | 123/90.6 |

FOREIGN PATENT DOCUMENTS

JP    10-130428    5/1998

* cited by examiner

*Primary Examiner*—Thomas Moulis
(74) *Attorney, Agent, or Firm*—Nixon & Vanderhye P.C.

(57) ABSTRACT

A fluid control valve has: a housing in which a fluid passage is formed; a valve seat in which a fluid flow hole is formed to be communicated with the fluid passage; and a valve that is formed from rubber elastic body. At least a part of the housing is formed from resin. The valve has a valve seal portion and is installed in the housing to be able to close the fluid flow hole. In a valve-closing time, the valve seal portion is seated on the valve seat. The valve seal portion is coated by a thin diamond-like carbon coating having hardness between Hv 50 and Hv 500 in Vickers hardness.

17 Claims, 14 Drawing Sheets

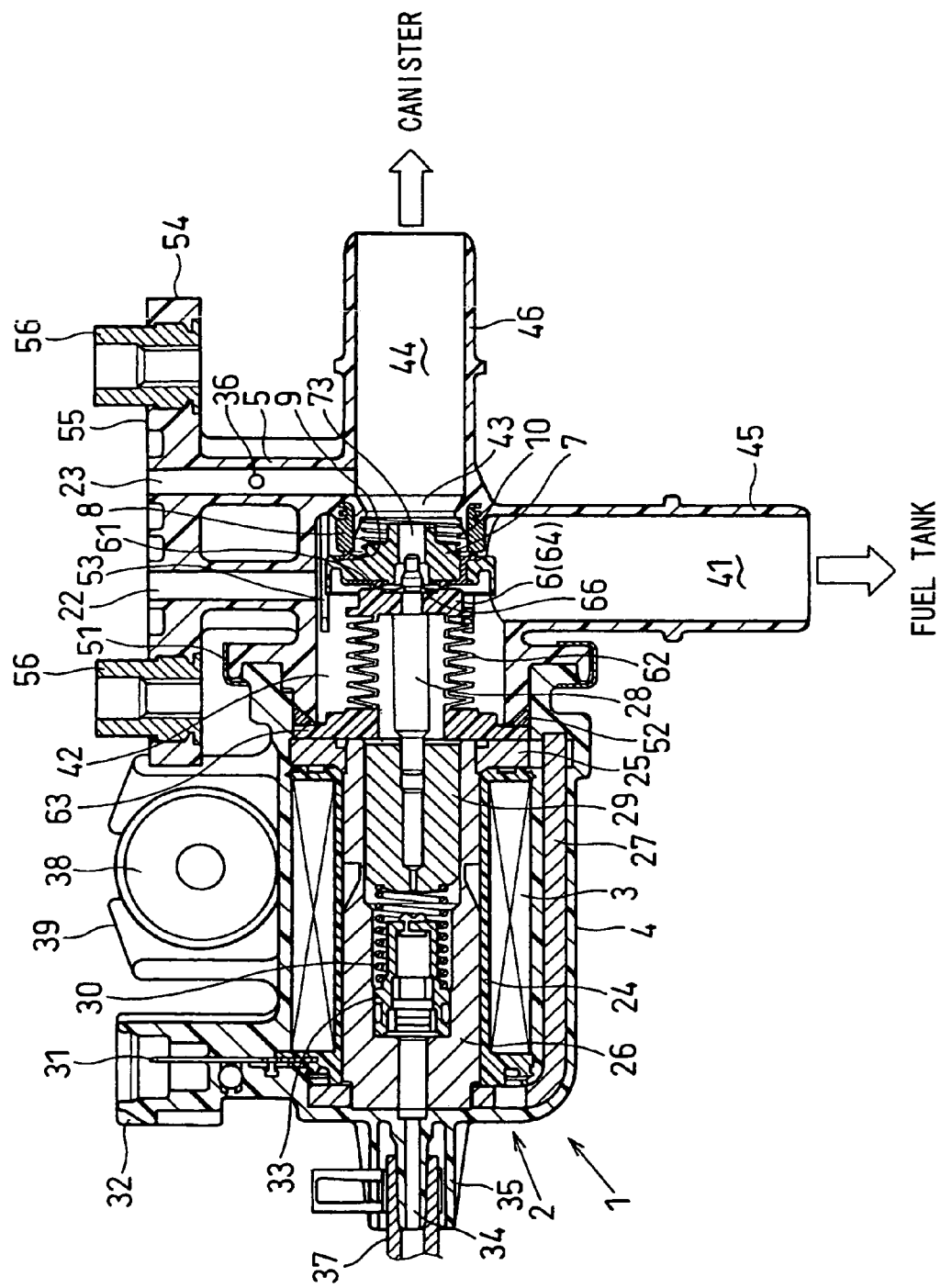

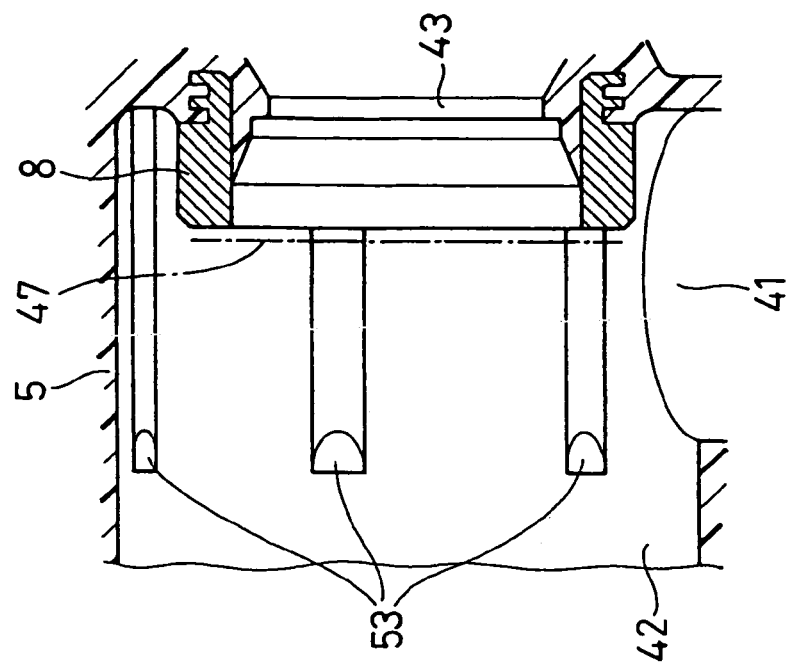
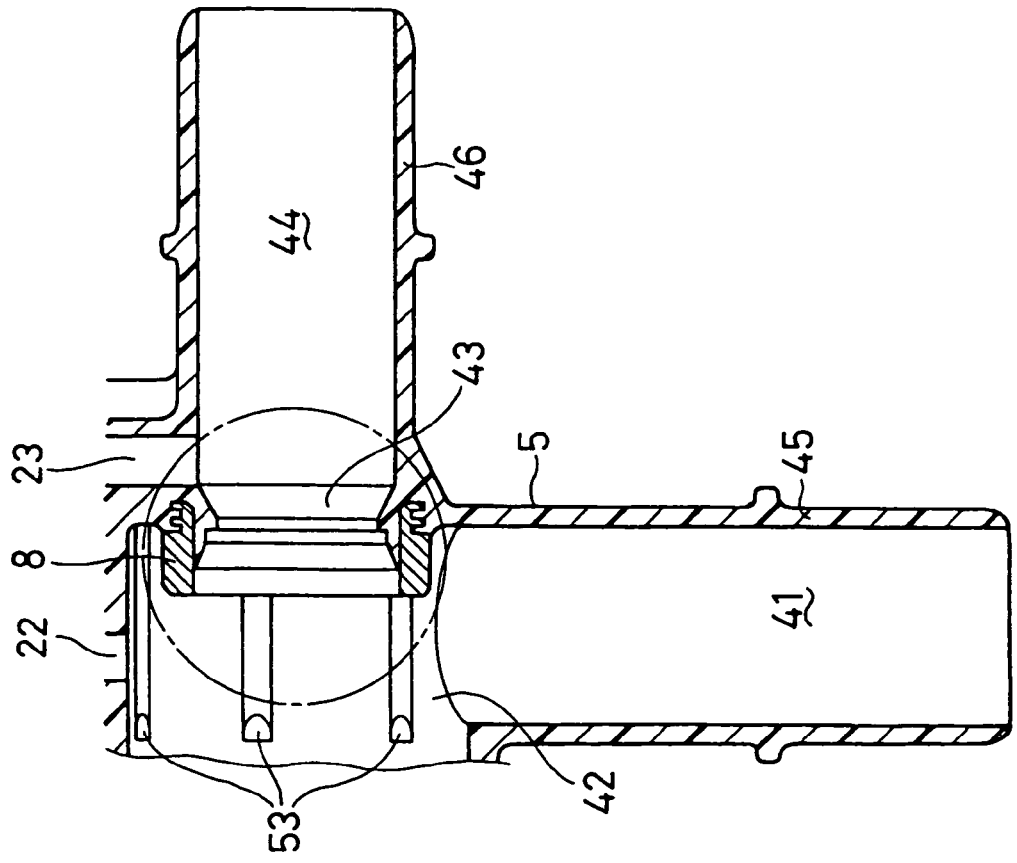
FIG. 5A
FIG. 5B

FLUID CONTROL VALVE

CROSS REFERENCE TO RELATED APPLICATION

This application is based upon and claims the benefit of priority of Japanese Patent Applications No. 2005-042489 filed on Feb. 18, 2005 and No. 2005-345032 filed on Nov. 30, 2005, the contents of which are incorporated herein by reference.

FIELD OF THE INVENTION

The present invention relates to a fluid control valve and an electromagnetic combination valve having a fine airtight performance under low-temperature condition. The present invention especially relates to an electromagnetic tank-sealing valve and the like that is incorporated in an evaporative emission control system, of which a rubber valve or a diaphragm is coated by a thin surface finishing coating, or of which a sealing rubber of a valve or a sealing rubber of a second valve is coated by a thin surface finishing coating.

BACKGROUND OF THE INVENTION

U.S. Pat. No. 6,526,951-B2, for example, discloses an electromagnetic combination valve provided with a first valve member (hereinafter referred to as first valve) and a second valve member (hereinafter referred to as second valve). The first valve opens when a solenoid coin in an electromagnetic driving portion attracts a moving core to one side in its axial direction. The second valve lifts off a cylindrical valve seat of a housing and opens when a backpressure, which acts on the second valve in a direction to close the second valve (in a valve-closing direction of the second valve), decreases to a valve-opening pressure of the second valve and a spring force of a coil spring urges the second valve to the one side in the axial direction. In the electromagnetic combination valve, the first valve forms a valve element of an electromagnetic opening/closing valve, and the second valve forms a valve element of a pressure-sensing valve. The pressure-sensing valve means a valve device with a valve-opening property to open when the backpressure, which acts on a rear face (pressure-receiving face) of the second valve, becomes smaller than the spring force of the coil spring.

In the electromagnetic combination valve, the second valve is provided with a rubber contact member (hereinafter referred to as sealing rubber), which is to come in contact with the valve seat of the housing, and the housing is formed from resinous material. Thus, in the case that the electromagnetic combination valve is used as a pressure-sensing valve in gasoline or gasoline vapor, adhesive substance may be deposited out of the resinous material and the rubber material. As a result, the adhesive substance may stick the sealing rubber of the second valve on the valve seat of the housing, to delay a valve-opening timing of the second valve or to lean the second valve. At worst, the second valve may be adhered in its valve-closing state and go out of order.

In this regard, it is considered to form a non-adherent surface treatment coating on the surface of the rubber formed part such as the sealing rubber of the second valve, to decrease the adherent degree or the frictional coefficient of the rubber formed part. As a method to decrease the adherent degree or the frictional coefficient of the surface of the rubber formed part, JP-H10-130428-A, for example, discloses a surface treatment method to form a fluorocarbon resin coating, a molybdenum disulfide coating or a diamond-like carbon (hereinafter referred to as DLC) coating on the surface of the rubber formed part.

In the case that the surface of the sealing rubber of the second valve has the fluorocarbon resin coating, the surface of the sealing rubber of the second valve is hardened under severely low-temperature condition, to decrease the airtight performance (to increase the fluid leakage degree) of the second valve, and the thickness of the coating must be large. Accordingly, the fluorocarbon resin coating is not suitable for the sealing rubber of the second valve that requires fine airtight performance under severely low-temperature condition. In the case that molybdenum disulfide powder is adopted as the material of the surface treatment coating put on the surface of the sealing rubber of the second valve, the surface of the coating has asperities due to the grain of the molybdenum disulfide powder. Accordingly, the molybdenum disulfide coating is not suitable for the sealing rubber of the second valve that requires fine airtight performance under severely low-temperature condition as the fluorocarbon resin coating is.

In the case that DLC is adopted as the material of the surface treatment coating of the sealing rubber of the second valve, DLC coating having a smooth surface and small thickness is effective to prevent the rubber gasket of the rubber formed part from sticking in contrast to the case that fluorocarbon resin coating or molybdenum disulfide coating is adopted as the material of the surface treatment coating. However, the hardness of DLC coating substance is around Hv 1000 and it is too large. As a result, it is difficult to secure airtight performance at the gap between the sealing rubber of the second valve and the valve seat of the housing in a valve-closing time of the second valve, that is, when the sealing rubber of the second valve is seated on the valve seat of the housing, under low-temperature condition.

Further, the DLC coating, which is adopted as the material to secure gas impermeability in plastic bottles formed from polyethylene terephthalate resin, has hardness around Hv 10, and it is too small. Thus, if the DLC coating is adopted as the material of the surface treatment coating of the sealing rubber of the second valve, the thin DLC coating on the surface of the sealing rubber of the second valve wears while the second valve repeats opening and closing operations, that is, the sealing rubber of the second valve repeats seating on and lifting off the valve seat of the housing. Accordingly, the durability and reliability of the DLC coating decreases, and it becomes impossible to keep the non-adhesive performance of the DLC coating.

It may also be considered to adopt a rubber material, which has fine flexibility and rich elastic deformability even under low-temperature condition, as the sealing rubber of the second valve. However, in the case that the sealing rubber, which has fine airtight performance under low-temperature condition, is adopted as the sealing rubber, if the second valve is kept in valve-closing state for a long period, the sealing rubber of the second valve is strongly stuck to the valve seat. If the sealing rubber is forcedly detached from the valve seat, the sealing rubber can be damaged, to decrease the durability and reliability of the airtight performance of the second valve under low-temperature condition.

SUMMARY OF THE INVENTION

The present invention is achieved in view of the above-described issues, and has an object to provide a fluid control valve that is able to secure airtight performance at a gap between a valve seat and a valve seal portion of a valve or a rubber seal portion of a sealing rubber and to maintain non-adhesive performance of a DLC coating at the same time, and to improve anti-abrasion performance at the gap between the valve seat and the valve seal portion of the valve or the rubber seal portion of the sealing rubber.

The present invention has another object to provide an electromagnetic combination valve that is able to secure airtight performance at a gap between a valve seat of a housing and a valve sealing rubber of a second valve and to maintain non-adhesive performance of a DLC coating at the same time, and to improve anti-abrasion performance at the gap between the valve seat of the housing and the sealing rubber of the second valve.

The fluid control valve has: a housing in which a fluid passage is formed and at least a part of which is formed from resinous material; a valve seat in which a fluid flow hole is formed to be communicated with the fluid passage; and a valve that is formed from rubber elastic body, has a valve seal portion and is installed in the housing to be able to close the fluid flow hole so that the valve seal portion is seated on the valve seat and to open the fluid flow hole so that the valve seal portion is lifted off the valve seat, the valve seal portion being coated by a thin diamond-like carbon coating having hardness between Hv 50 and Hv 500 in Vickers hardness.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 4 is a cross-sectional view showing an entire construction of the electromagnetic combination valve according to the first embodiment;

FIG. 5A is a cross-sectional view showing a principal portion of a resin housing in the electromagnetic combination valve according to the first embodiment;

FIG. 5B is a cross-sectional view showing a construction adjacent to a valve seat of the resin housing in the electromagnetic combination valve according to the first embodiment;

DETAILED DESCRIPTION OF PREFERRED EMBODIMENTS

Figure 1:
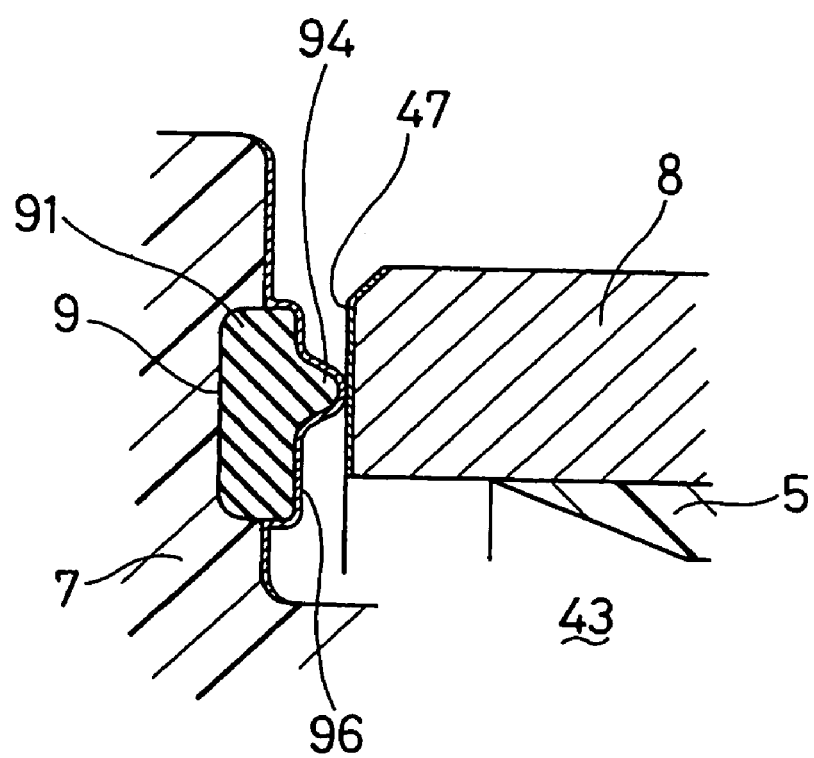
FIG. 1 is a cross-sectional view showing a principal portion of an electromagnetic combination valve according to a first embodiment of the present invention.
Figure 2:
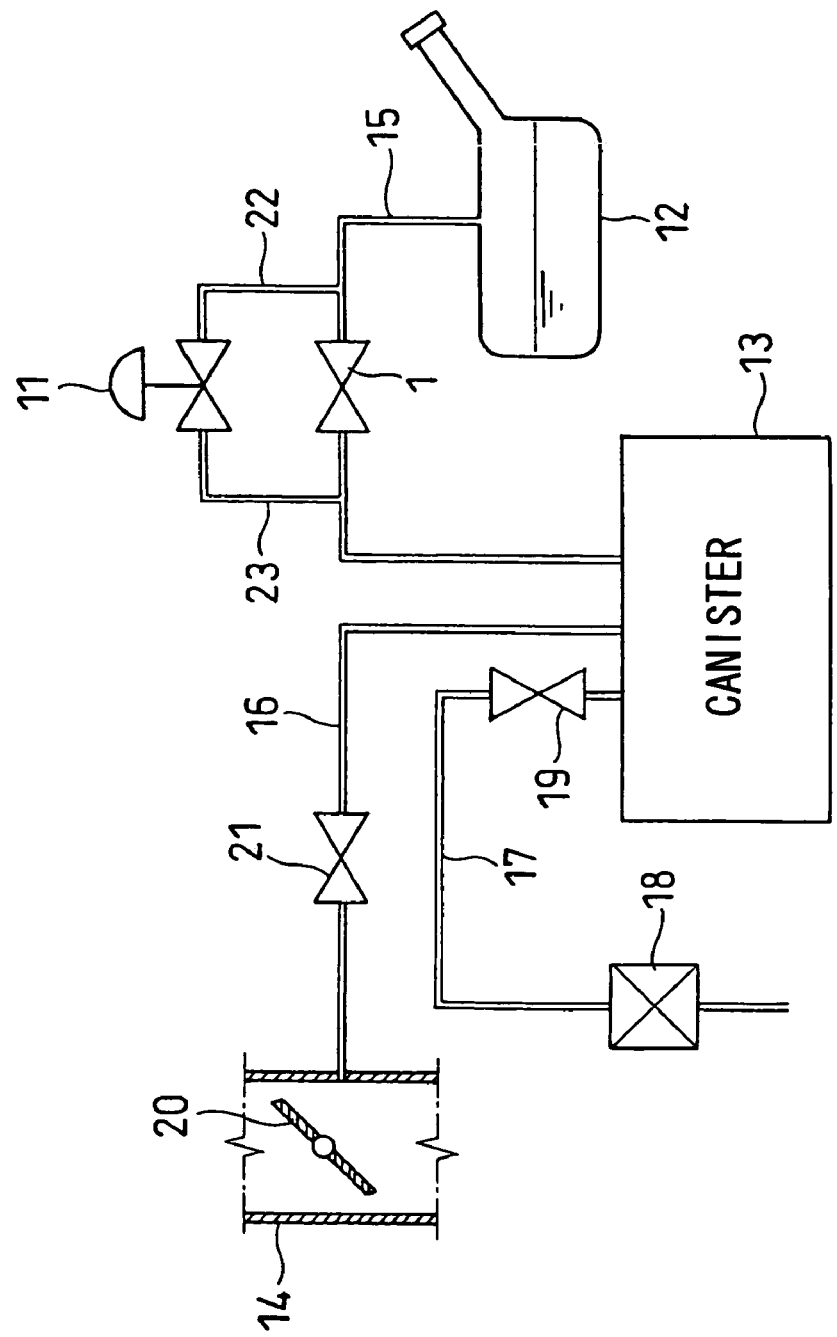
FIG. 2 is a schematic view showing an entire construction of an evaporative emission control system including the electromagnetic combination valve according to the first embodiment.
Figure 3:
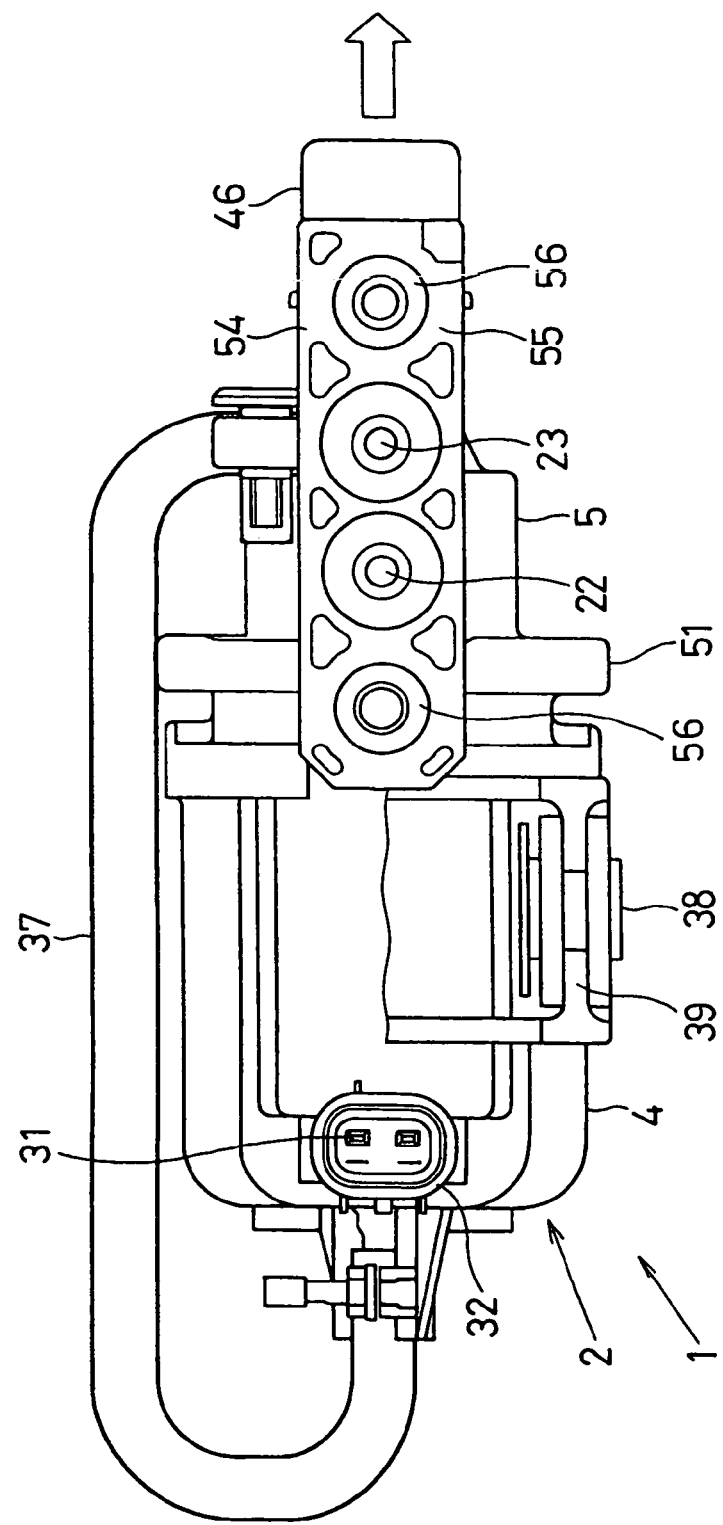
FIG. 3 is a top view showing an entire construction of the electromagnetic combination valve according to the first embodiment.
Figure 6:
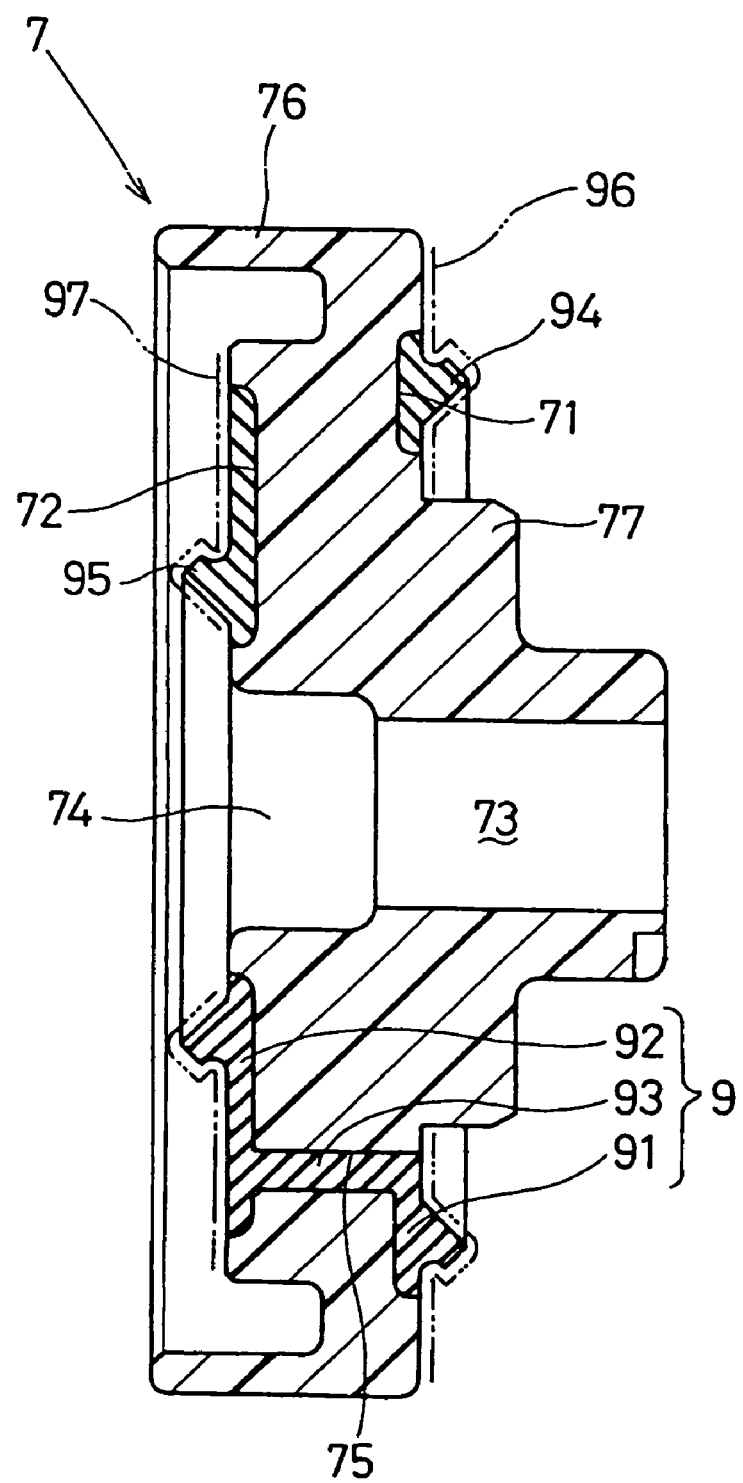
FIG. 6 is a cross-sectional view showing an entire construction of a second valve in the electromagnetic combination valve according to the first embodiment.

In the following embodiments of the present invention, an object of the present invention to secure airtight performance at a gap between a valve seal portion of a valve and a valve seat under low-temperature condition and to maintain non-adhesive performance of DLC coating at the same time is realized by forming a thin DLC coating having hardness of Hv 50 to Hv 500 in Vickers hardness at least on the surface of the valve seal portion of the surface of the valve. Then, another object of the present invention improve anti-abrasion performance at the gap between the valve seal portion of the valve and the valve seat at the same time is realized by forming the thin DLC coating having hardness of Hv 50 to Hv 500 in Vickers hardness at least on the surface of the valve seal portion of the surface of the valve.

Further, still another object of the present invention to secure airtight performance at a gap between a rubber seal portion of a sealing rubber and a valve seat under low-temperature condition and to maintain non-adhesive performance of DLC coating at the same time is realized by forming a thin DLC coating having hardness of Hv 50 to Hv 500 in Vickers hardness at least on the surface of the rubber seal portion of the surface of the sealing rubber. Then, still another object of the present invention to improve anti-abrasion performance at the gap between the rubber seal portion of the sealing rubber and the valve seat at the same time is realized by forming the thin DLC coating having hardness of Hv 50 to Hv 500 in Vickers hardness at least on the surface of the rubber seal portion of the surface of the sealing rubber.

Furthermore, an object of the present invention to secure the airtight performance at the gap between a sealing rubber of a second valve and a valve seat of a housing at low-temperature condition and to maintain non-adhesive performance of DLC coating at the same time is realized by forming a DLC coating having hardness of Hv 50 to Hv 500 in Vickers hardness on the surface of the sealing rubber of the second valve. Then, an object of the present invention to improve anti-abrasion performance at the gap between the sealing rubber of the second valve and the valve seat of the housing is realized by providing the valve seat of the housing with a valve seat portion formed from metallic material and by coating non-adhesive agent having fine anti-abrasion performance on the surface of the valve seat portion.

First Embodiment

A fluid control valve according to a first embodiment of the present invention is described in the following, referring to FIGS. 1 to 7.

In the first embodiment, the electromagnetic valve 1 corresponds to the fluid control valve according to the present invention, and is incorporated in an evaporative emission control system of a vehicle such as an automobile, together with a relief valve 11. The electromagnetic valve 1 serves as an electromagnetic tank-sealing valve. The electromagnetic tank-sealing valve includes a normally-closed electromagnetic opening/closing valve, which opens for a predetermined period while the vehicle is traveling and at a time just before a fuel tank 12 is refueled and closes at all other times, and a pressure-operated pressure control valve (pressure-sensing valve). The evaporative emission control system is a vaporized fuel (evaporated gas) fly-off prevention system that prevents fluid such as vaporized fuel from flying off into the atmosphere by recovering the fluid such as vaporized fuel, which is vaporized (volatilized) in the fuel tank 12 of the vehicle, through a canister 13 into an engine intake pipe 14 of an internal combustion engine (hereinafter referred to as engine) such as a gasoline engine, which has negative pressure in the engine intake pipe 14. That is, the evaporative emission control system purges the vaporized fuel in emission gas.

In the evaporative emission control system, a connection pipe 15 communicates the fuel tank 12 with the canister 13, and another connection pipe 16 communicates the canister 13 with the engine intake pipe 14. The fuel tank 12 is provided with a pressure sensor (in-tank pressure sensor: not shown) to detect a pressure in the fuel tank 12 (in-tank pressure). In the canister 13 is installed adsorbent such as activated carbon to adsorb the fluid such as vaporized fuel. A vent pipe 17 is connected to a vent hole of the canister 13. On the way of the vent pipe 17 are provided: a filter 18 that filtrates the gas flowing into the canister 13; and a canister control valve 19 that is a normally-opened electromagnetic opening/closing valve that closes the vent hole of the canister 13 as demanded. The filter 18 passes the gas flowing from an inlet portion (the vent hole) of the vent pipe 17 and traps foreign matters contained in the gas to prevent the foreign matters from entering into the engine intake pipe 14.

Further, in the engine intake pipe 14 is installed a throttle valve 20 that adjusts an amount of intake gas fed to an intake gas passage communicated with respective combustion chambers of the engine. On the way of the connection pipe 15 is installed a tank-sealing valve unit including the electromagnetic valve 1 and the relief valve 11. On the way of the connection pipe 16 is installed an electromagnetic valve 21. The electromagnetic valve 21 acts as a purge control valve that adjusts purge amount of the fluid such as vaporized fuel. The connection pipe 16 is connected with the engine intake pipe 14 at a position downstream a throttle valve 20 in the airflow direction of the intake gas (at the side of an intake port of the engine). The leakage of the fluid such as vaporized fuel is checked in accordance with the following procedure. Firstly, the canister control valve 19 closes the vent hole of the canister 13. Next, the electromagnetic valve 21 opens to introduce the negative pressure in the engine intake pipe 14 to the connection pipes 15, 16, and then the electromagnetic valve 21 closes to completely interrupt the fluid such as vaporized fuel. After a predetermined period of time is elapsed after the electromagnetic valve 21 is closed, a pressure sensor detects the pressure in the fuel tank 12 to detect the pressure is increased or not, to check the leakage of the fluid such as vaporized fuel.

The relief valve 11 is a pressure adjustment valve that opens when the pressure at the side of the fuel tank 12 is large enough relative to the pressure at the side of the canister 13. The relief valve 11 is formed from: valve holes (not shown) that is provided between bypass flow passages 22, 23 to detour the first and the second valves 6, 7 of the electromagnetic valve 1; a valve element (not shown) that opens and closes the valve holes; a diaphragm (not shown) that drives the valve element in the valve-opening direction; a spring (not shown) that urges the valve element in the valve-closing direction; and so on.

The valve holes are formed in the valve body of the relief valve 11. The valve element is slidably installed in the valve body of the relief valve 11 in an axial direction of a valve shaft. The pressure at the side of the canister 13 (standard pressure) acts onto a first pressure chamber in a casing, which is partitioned by the diaphragm. The pressure at the side of the fuel tank 12 acts onto the second pressure chamber in the casing, which is partitioned by the diaphragm.

In the following is described a construction of the electromagnetic valve 1 according to the first embodiment, referring to FIGS. 1 to 7.

The electromagnetic valve 1 includes: an electromagnetic driving portion 2 that acts as an electromagnetic actuator; a resin housing 5 that is a resin molded part and swaged to be fixed to a connection end face of a resin molded member 4 of the electromagnetic driving portion 2; a first valve 6 that is a resin molded part and opens when the electromagnetic driving portion 2 drives the first valve 6 in its valve-opening direction (to one side in the axial direction); and a second valve 7 that is a resin molded part and acts as a valve element, which opens when the pressure at the side of the fuel tank 12 decreases to a predetermined value (valve-opening pressure).

The electromagnetic driving portion 2 is provided with: a solenoid coil 3 that is a wire repeatedly wound by predetermined times; a coil bobbin 24 that has a pair of flange portions between which the solenoid coil 3 is wound; a magnetic plate 25, a stator core 26 and a yoke 27 that are magnetized when the solenoid coil 3 is energized; a moving core 29 that is a magnetic body movable in its axial direction together with the first valve 6 and with the valve shaft 28 by being magnetized when the solenoid coil 3 is energized; and a return spring 30 that urges the first and the second valves 6, 7, the valve shaft 28 and the moving core 29 in the valve-closing directions.

The solenoid coil 3 is an insulated wire repeatedly wound on the coil bobbin 24, and installed in a cylindrical coil installation portion formed between the stator core 26 and the yoke 27. The solenoid coil 3 generates magnetomotive force when it is energized to magnetize magnetic members (the magnetic plate 25, the stator core 26, the yoke 27, the moving core 29, and so on), which are respectively made of magnetic material, to drive the first valve 6, the valve shaft 28 and the moving core 29 in the valve-opening direction. The solenoid coil 3 includes a coil portion that is wound on an outer circumference of the coil bobbin 24, and a pair of lead wires led out of the coil portion.

The radially circumferential portion of the solenoid coil 3 is coated and protected by a resin molded member 4, which serves as a resin case. A pair of the lead wires of the solenoid coil 3 are electrically connected by swaging, welding or the like to a pair of external connection terminals, which is to be electrically connected to an outer electric power source or to an electromagnetic valve driving circuit. The leading end portions of a pair of the outer connection terminals 31 serve as connector pins, which are exposed in a connector shell (male connector portion) 32 of the resin molded member 4 and to be plugged into a female connector portion at the side of the outer electric power source or the electromagnetic valve driving circuit to form an electric connection with the outer electric power source or the electromagnetic valve driving circuit.

The stator core 26 has an attracting portion that is magnetized to attract the moving core 29 thereto when the solenoid coil 3 is energized. In the stator core 26 is a fitted piece 33, which is a cylindrical restriction member for limiting longitudinal traveling distances of the first and the second valves 6, 7, the valve shaft 28 and the moving core 29. The yoke 27 forms a magnetic circuit together with the solenoid coil 3, the magnetic plate 25, the stator core 26 and the moving core 29. The moving core 29 is magnetized and attracted to the attracting portion of the stator core 26 when the solenoid coil 3 is energized. In the moving core 29 is fitted one axial end portion of the valve shaft 28. One end of the return spring 30 is supported by the piece 33, and the other end of the return spring 30 is supported by the moving core 29.

The resin molded member 4 is a secondary resin molded part that is secondary molded and made of an electrical insulating resin such as thermoplastic resin (polybutylene telephthalate: PBT, polyphenylene sulfide: PPS or polyamide resin: PA, for example). The resin molded member 4 is disposed radially outside the coil portion of the solenoid coil 3 and the coil bobbin 24. Inside the resin molded member 4 is formed the yoke 27 by insert molding, and on an inner circumference of the resin molded member 4 is fixed the magnetic plate 25. The other axial end portion (right end portion in the drawing) of the resin molded member 4 is provided with an annular connection end face, which is connected with the connection end face of the resin housing 5. The resin molded member 4 is provided with a pipe-shaped portion 35 that has a pressure release hole 34 to smooth the opening/closing motions (reciprocating motions in the axial direction) of a bellows of the first valve 6, which is described later, the valve shaft 28 and the moving core 29.

The pressure release hole 34 is communicated with a cylindrical space in the bellows of the first valve 6 via a small diameter hole formed in the stator core 26 in the axial direction, a longitudinal hole formed in the piece 33, a large diameter bore formed in the stator core 26, and a longitudinal hole formed in the moving core 29 or a clearance formed between an inner circumferential face of the stator core 26 and an outer circumferential face of the moving core 29. To the pipe-shaped portion 35 is connected a hose 37 to communicate a pressure release hole 34, which opens at one axial end portion of the electromagnetic driving portion 2, with a pressure release hole 36, which opens on the way of the bypass flow passage 23. Further, on the outer circumferential portion of the resin molded member 4 is integrally formed an attachment stay portion 39, which is screw-fastened to a ceiling wall of the fuel tank 12 with a fastening member such as a fastening bolt inserted in a through hole of a cylindrical collar 38.

The resin housing 5 is formed in a predetermined shape from a thermoplastic resin (polyphenylene sulfide: PPS, polybutylene telephthalate: PBT or polyamide resin: PA, for example). The resin housing 5 defines a valve chamber 42 between itself and the other axial end face of the electromagnetic driving portion 2 (between one end face of the magnetic plate 25 and one end face of the stator core 26), and serves as a passage member to provide two fluid passages 41, 44, which are connected to the valve chamber 42 in an approximately L-shaped fashion. In the first embodiment, the valve chamber 42 and the fluid passage 44 are communicated with each other by a valve hole 43, which is a passage port of the fluid passage 44 to flow the fluid such as vaporized fuel therethrough.

Further, at the upstream side of the resin housing 5 (at a lower end portion in the drawing) is integrally formed an approximately round pipe-shaped fluid passage pipe 45, which is an inlet pipe connected to the fuel tank 12 via an upstream end portion of the connection pipe 15. Inside the fluid passage pipe 45 is formed the fluid passage (tank-side fluid passage) 41. At the downstream side of the resin housing 5 is integrally formed an approximately round pipe-shaped fluid passage pipe 46, which is an outlet pipe connected to the canister 13 via a downstream portion of the connection pipe 15. Inside the fluid passage pipe 46 is formed the fluid passage (canister-side fluid passage) 44 including the outlet port.

The valve chamber 42 is formed in an approximately cylindrical shape inside a depressed portion, which is opened toward the electromagnetic driving portion 2, of the resin housing 5 that is fitted to an inner circumference of the resin molded member 4. The valve chamber 42 forms a fluid passage in which the first and the second valves 6, 7 can reciprocatingly move in the axial direction. The fluid passage pipe 46 is formed in the axial direction of the resin housing 5. The fluid passage pipe 45 is integrally formed on an outer circumferential portion of the resin housing 5 to protrude radially outward therefrom in a radial direction approximately perpendicular to the axial direction of the resin housing 5.

In the first embodiment, an inner circumferential portion of a cylindrical portion of the resin housing 5 is provided with a cylindrical valve seat to seat the second valve 7 thereon. The valve seat of the resin housing 5 has a valve seat portion 8 on which the second valve 7 seats. The valve seat portion 8 is formed from metallic material (metal base material such as stainless steel). The valve seat portion 8 is insert molded to extend from an end face of a ring-shaped partition wall, which partitions the valve chamber 42 and the fluid passage 44 from each other, toward the electromagnetic driving portion 2. In the valve seat portion 8 is formed the valve hole 43, which communicates the valve chamber 42 with the fluid passage 44 and is opened and closed by the second valve 7.

Non-adhesive agent (lubricant) 47 having a fine anti-abrasion performance is coated (formed or spread) on the surface (at least on the sealing surface) of the valve seat portion 8. As the non-adhesive agent 47, it is desirable to adopt at least one of fluorocarbon resin (such as polytetrafluoroethylene (PTFE), polymonochlorotrifluoroethyle (PCTFE), polyvinylidene fluoride (PVDF), polyvinyl fluoride (PVF), tetrafluoroethylene-co-hexafluoropropylene (FEP), ethylene-tetrafluoroethylene resin (ETFE), tetrafluoroethyrene-perfluoroalkylvinyl ether (PFA) and the like), molybdenum disulfide ($MoS_2$) and DLC. The non-adhesive agent 47 has a thickness of 0.40 μm to 1.00 μm.

Further, a metal ring 51 is fixed on the outer circumferential portion of the cylindrical portion of the resin housing 5 at the side of the electromagnetic driving portion 2 with respect to the valve seat. The metal ring 51 is for swaging the connection end face of the cylindrical portion of the resin housing 5, which is at the electromagnetic driving portion 2 with respect to the valve seat, on the connection end face of the resin molded member 4. A leading end face (tapered face) of the cylindrical portion of the resin housing 5, which is at the side of the electromagnetic driving portion 2 with respect to the valve seat, is provided with an O-ring 52, which is a ring-shaped elastic body, in intimate contact fashion to prevent the fluid such as vaporized fuel from leaking out of the electromagnetic valve 1. Thus, the electromagnetic driving portion 2 and the resin housing 5 is connected with each other in airtight fashion.

An inner circumferential face of the cylindrical portion of the resin housing 5, which is at the side of the electromagnetic driving portion 2 with respect to the valve seat, (an inner face of the valve chamber 42 at the side of the valve seat) is provided with a valve-sliding portion that slidably supports an outer diametrical face of a radially outermost face (outer circumferential face) of the second valve 7. The valve-sliding portion is formed from a plurality of valve guides (protruding rib portions) 53. The number of the valve guides is six in the first embodiment. These valve guides 53 protrude from the inner circumferential face of the cylindrical portion of the resin housing 5, which is at the side of the electromagnetic driving portion 2 with respect to the valve seat, toward a central axis by a predetermined protruding length. Two adjacent valve guides 53 form a fluid passage therebetween.

An upper side portion (in the drawing) of the resin housing 5 with respect to the valve seat is integrally formed a bracket 54 for fixing the valve body of the relief valve 11. In the bracket 54 is formed the bypass flow passage 22, which communicates the valve chamber 42 with a valve hole of the relief valve 11 and the second pressure chamber, and the bypass flow passage 23, which communicates the fluid passage 44 with the valve hole of the relief valve 11 and the first pressure chamber. In a fixing seat portion 55 of the bracket 54, which is for fixing the relief valve 11 thereon, is insert molded an insert nut 56, which is screw-fastened with a fastening bolt to screw-fasten the valve body of the relief valve 11.

The first valve 6 is a resin molded part that is formed from resinous material (resin base material) such as thermoplastic resin (fluorocarbon resin, polytetrafluoroethylene: PTFE, and the like). The first valve 6 is coupled to and driven by the moving core 29 of the electromagnetic driving portion 2 via the valve shaft 28. The first valve 6 is provided to be able to reciprocate in the approximately cylindrical valve chamber 42, which is formed between the electromagnetic driving portion 2 and the resin housing 5, in the axial direction. A magnetomotive force of the solenoid coil 3 moves the first valve 6 to the one side in the axial direction to open the solenoid coil 3 (valve-opening state). In a valve-opening time of the first valve 6, the first valve 6 is lifted off the molded rubber of the second valve 7, which is described later, to open a communication path, which is also described later. When the solenoid coil 3 is demagnetized to extinguish the magnetomotive force thereof, the spring force of the return spring 30 moves the first valve 6 to the other side in the axial direction to close the first valve 6 (valve-closing state). In a valve-closing time of the first valve 6, the first valve 6 is seated on the molded rubber of the second valve 7 to close the communication path.

A right end face (in the drawing) of the first valve 6 is provided with an annular plate-shaped resin seal portion 61, which is formed from resinous material and which can seat on the molded rubber of the second valve 7. The first valve 6 is integrally formed with a bellows 62, which is accordion-folded to be able to extend and shrink in the axial direction. At one axial end portion of the bellows 62 is integrally formed a ring-shaped flange portion 63, which serves as a fixed portion (fixing seat portion) of the first valve 6. The flange portion 63 is sandwiched between an end face of the magnetic plate 25 of the electromagnetic driving portion 2 and one end face (tapered face) of the resin housing 5 via the O-ring 52. At the other axial end portion of the bellows 62 is integrally formed a ring-shaped portion (valve body) 64, which serves as a main component (moving portion) of the first valve 6.

The first valve 6 is integrally formed in the other axial end portion of the bellows 62, and sandwiched between an annular end face of the large diameter portion of the valve shaft 28 and a wave washer 66 (refer to FIG. 8), which is engaged with a flange portion of the valve shaft 28. As the wave washer 66, a snap washer (or a ring-shaped elastic body such as a ring-shaped leaf spring) can also be used that has a spring function to push the valve body 64, which serves as a main component of the first valve 6, onto the annular end face of the large diameter portion of the valve shaft 28. A part of the first valve 6, which is to be in contact with the wave washer 66, is a depressed portion 67 (refer to FIG. 8) that is ring-shaped and slightly depressed with respect to the resin seal portion 61. Further, in the first valve 6 is formed a longitudinal hole 69 (refer to FIG. 8) that communicates the annular end face at the left portion (in the drawing) of the valve body 64 with a bottom face of the depressed portion 67. The longitudinal hole 69 is a round hole coaxially disposed with the first valve 6. A right end portion (in the drawing) (the other axial end portion) of the valve shaft 28 is press-fitted in the longitudinal hole 69. Thus, the first valve 6 can integrally move with the valve shaft 28 and with the moving core 29. The right axial end portion (in the drawing) of valve shaft 28, that is, a portion protruding rightward (in the drawing) beyond the annular end face of the large diameter portion of the valve shaft 28 is a small diameter portion, which has a diameter smaller than that of the large diameter portion of the valve shaft 28.

The second valve 7 is a resin molded part that is integrally formed from resinous material (resin base material) such as thermoplastic resin (polyphenylene sulfide: PPS and the like, for example). The second valve 7 can reciprocate in the valve chamber 42 in the axial direction, as the first valve 6 does. When the first valve 6 opens and the pressure at the side of the fuel tank 12 (the pressure in the fluid passage 41 and in the valve chamber 42) decreases to a predetermined value, the spring force of the coil spring 10 moves the second valve 7 to the one side in the axial direction to open the second valve 7 (valve-opening state). In the valve-opening time of the second valve 7, the second valve 7 is lifted off the valve seat of the resin housing 5, to open the valve hole 43. In the valve-closing time of the first valve 6, the spring force of the return spring 30 moves the second valve 7 together with the first valve 6 to the other side in the axial direction to close the second valve 7 (valve-closing state). In the valve-closing time of the second valve 7, the second valve 7 is seated on the valve seat of the resin housing 5, to close the valve hole 43.

A right portion of the second valve 7 (in the drawing) is shaped in a stepped manner (in a multiply stepped-ring shape). On the annular end face of the second valve 7 (right end face in the drawing), which faces the valve seat of the resin housing 5 to form a predetermined gap therebetween in the valve-opening time of the second valve 7, is formed an annular shaped circumferential groove 71. A left portion (in the drawing) of the second valve 7 is formed in a single ring shape. On the annular end face of the second valve 7 (left end in the drawing), which faces the resin seal portion 61 of the first valve 6 to form a predetermined gap therebetween, is formed an annular shaped circumferential groove 72.

In a radially central portion of the second valve 7 is formed a communication passage 73, which communicates the left annular end face (in the drawing) of second valve 7 with the right annular end face (in the drawing) of the second valve 7. The communication passage 73 is a round hole coaxially formed to the second valve 7. When the first valve 6 is opened before the second valve 7 is lifted off the valve seat of the resin housing 5, the communication passage 73 communicates a valve chamber 42, which is located at an upstream side in a fluid flow direction with respect to the valve seat of the resin housing 5, with a fluid passage 44, which is located at a downstream side in the fluid flow direction with respect to the valve seat of the resin housing 5.

In the first embodiment, an upstream end of the communication passage 73 opens on a bottom face of the depressed portion 74, which has a bore diameter larger than that of the communication passage 73. The depressed portion 74 can prevent an interference with an axial leading end portion (the other end portion) of the valve shaft 28. In the second valve 7 is further formed a through hole 75 that communicates a bottom face of the circumferential groove 71 with a bottom face of the circumferential groove 72. The through hole 75 penetrates the second valve 7 in the axial direction (in a thickness direction of the second valve 7) at a radially off-centered position to be apart from the communication passage 73 of the second valve 7. On the outer circumferential portion of the second valve 7 is integrally formed a fitting portion 76, which is a cylindrical rib portion slidably fitted to a plurality of the valve guides 53 of the resin housing 5. The fitting portion 76 is shaped in an approximately cylindrical shape to protrude radially outward from the outer circumferential face of the second valve 7.

In the first embodiment, the fitting portion 76 is formed from a ring-shaped flange portion, which protrudes radially outward from the outer circumferential face of the second valve 7, a cylindrical radially outermost portion (cylindrical portion, sliding portion), which extends from the outer peripheral portion of the flange portion toward the electromagnetic driving portion 2 in the axial direction, and so on. The fitting portion 76 is fitted to and supported by the inner circumferential face (inner diametrical face) of a plurality of the valve guides 53 to provide a sliding clearance with a predetermined width (around 0.3 μm to 0.7 μm, desirably around 0.5 μm, for example), to be slidable relative to the cylindrical portion at the electromagnetic driving portion 2 side with respect to the valve seat of the resin housing 5. Thus, the outer diametrical face of the radially outermost portion of the fitting portion 76 of the second valve 7 is slidably supported by the valve-sliding portion of the cylindrical portion, which is at the side of the electromagnetic driving portion 2 with respect to the valve seat of the resin housing 5, especially by the inner diametrical face of a plurality of the valve guides 53.

Then, in the first embodiment, a molded rubber 9 is mold formed from rubber material on and in the annular end faces of the second valve 7 to act as a sealing rubber. The molded rubber 9 is for improving an airtight seal performance between the second valve 7 and the valve seat of the resin housing 5 (second valve seat) and for improving an airtight seal performance between the first valve 6 and the valve seat of the second valve 7 (first valve seat). The molded rubber 9 is formed from rubber elastic body (rubber material, rubber base material: fluorine rubber, silicon rubber, and the like) that has excellent performance in durability and formability, and a flexibly deformable elasticity (fine flexibility and rich elastic deformability).

In the first embodiment, the molded rubber 9 is formed from rubber elastic body that generates repulsive force to urge the second valve 7 in the valve-opening direction when the second valve 7 is seated on the valve seat of the resin housing 5. The molded rubber 9 has: a rubber seal portion 91 that is formed in a ring shape and mold formed in the circumferential groove 71, which is formed on the right annular end face (in the drawing) of the second valve 7 opposite from the pressure-receiving face; a rubber seat portion 92 that is formed in a ring shape and mold formed in a circumferential groove 72, which is formed on the left end face (in the drawing) of the second valve 7 (pressure-receiving face); a rubber filled portion 93 that is filled in the through hole 75, which is formed in the second valve 7; and so on. The second valve 7 is injection molded and cooled down, and then the second valve 7 is put in an injection molding form and the molded rubber 9 is rubber molded (mold formed) on the annular end faces on both sides of the resinified second valve 7 and in the second valve 7 by using the second valve 7 as a part of the injection molding form. The rubber seal portion 91, the rubber seat portion 92 and the rubber filled portion 93 are supported and welded on each other in this manner. The rubber filled portion 93 serves as a rubber connection portion that connects the rubber seal portion 91 with the rubber seat portion 92.

The rubber seal portion 91 is an elastic seal portion that is seated on and lifted off the valve seat portion 8 of the resin housing 5 to close and open the valve hole 43. In the first embodiment, a surface of a ring-shaped portion (base portion) of the rubber seal portion 91, which is filled in (supported by, welded on) the circumferential groove 71, is flat with respect to the right annular end face (in the drawing) of the second valve 7. Alternatively, the surface of the ring-shaped portion (base portion) of the rubber seal portion 91 may be protruded beyond or depressed from the right annular end face (in the drawing) of the second valve 7 (refer to FIG. 1).

On the surface of the rubber seal portion 91 is formed an approximately ring-shaped sealing lip portion 94 to improve airtight performance (degree of intimate contact) between itself and the valve seat portion 8 of the resin housing 5. The sealing lip portion 94 protrudes from the surface of the rubber seal portion 91 toward the valve seat of the resin housing 5 by a predetermined protruding height (around 1 mm, for example). The sealing lip portion 94 has an elastically deformable property to be flexibly and elastically deformable in all directions. Thus, the sealing lip portion 94 can securely seal the gap between the rubber seal portion 91 and the valve seat portion 8 even if there are small asperities on the surface of the valve seat portion 8 of the resin housing 5.

The rubber seat portion 92 is an elastic seat portion on which the resin seal portion 61 of the first valve 6 is seated and off which the resin seal portion 61 of the first valve 6 is lifted, to close and open the communication passage 73. In the first embodiment, the rubber seat portion 92 is positioned so that the left annular end face (in the drawing) of the second valve 7 is flat relative to the surface of the ring-shaped portion (base portion) of the rubber seat portion 92, which is filled in (supported by or welded on) the circumferential groove 72. Alternatively, the surface of the ring-shaped portion (base portion) of the rubber seat portion 92 may be protruded or depressed from the left annular end face (in the drawing) of the second valve 7.

On the surface of the rubber seat portion 92 is provided an approximately ring-shaped sealing lip portion 95 to improve airtight performance (degree of intimate contact) between itself and the resin seal portion 61 of the first valve 6. The sealing lip portion 95 protrudes from the surface of the rubber seat portion 92 toward the resin seal portion 61 of the first valve 6 by a predetermined protruding height (around 1 mm, for example). The sealing lip portion 95 has an elastic property to be flexibly deformable in all directions. Thus, the sealing lip portion 95 can securely seal the gap between the rubber seat portion 92 and the sealing lip portion 95 even when there are small asperities on the surface of the resin seal portion 61 of the first valve 6.

In the first embodiment, a thin DLC coating 96 is formed on the surface of the rubber seal portion 91 of the molded rubber 9, that is, on the surface of the rubber formed portion outside the circumferential groove 71 and exposed to fluid, and on the annular end face at the right portion (in the drawing) of the second valve 7, that is, on the surface of the resin formed portion. Further, a thin DLC coating 97 is formed on the surface of the rubber seat portion 92 of the molded rubber 9, that is, on the surface of the rubber formed portion outside the circumferential groove 72 and exposed to fluid, and on the annular end face the second valve 7 at the left portion (in the drawing) of the second valve 7. Each of the DLC coatings 96, 97 has a smooth surface, thin thickness and highly airtight performance and fine in nonadhesiveness. Each of the DLC coatings 96, 97 is a surface treatment coating having fine anti-abrasion performance and a relatively small frictional coefficient, and coated on both end faces of the second valve 7 and on the surface of the molded rubber 9 by chemical vapor deposit (CVD) method in material gas such as methane and ethane.

As the CVD method, it is possible to adopt filament CVD method to excite the material gas by heat generated by an energized filament, heat CVD method to excite the material gas by heating a suscepter by high frequency wave or resistance heater, plasma CVD method to excite the material gas by plasma generated between electrodes by high frequency wave or direct current, microwave plasma CVD method to excite the material gas by microwave, light CVD method to light-excite the material gas by a lamp, and so on. Further, it is possible to adopt ultraviolet excitation method, electron excitation method and the like to excite the material gas. Furthermore, it is possible to form the DLC coating 96, 97 on both end faces of the second valve 7 and on the surface of the molded rubber 9 by film formation method. The resin formed portion and the rubber formed portion have relatively small resistance against high temperature, so that it is desirable to adopt the method that can be carried out at relatively low temperature. In this case, plasma CVD method, sputtering method or ion plating method can be used.

Figure 7:
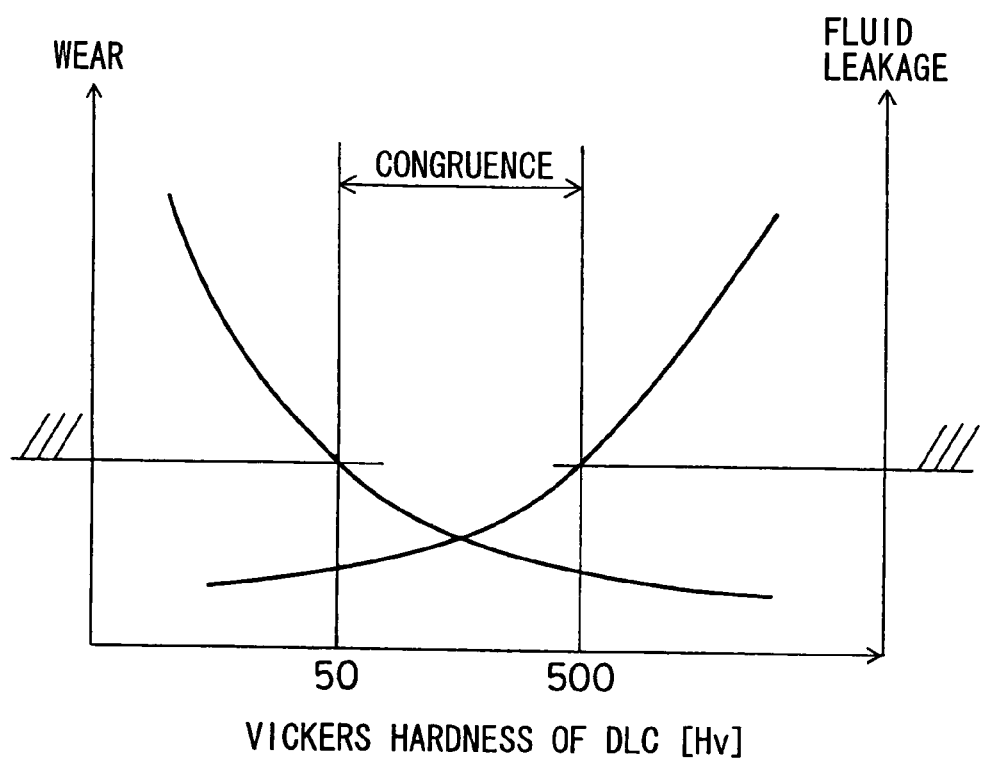
FIG. 7 is a graph schematically showing an abrasion degree and a fluid leakage degree relative to Vickers hardness of a DLC (diamond-like carbon) coating on the second valve in the electromagnetic combination valve according to the first embodiment.

It is effective to perform ultraviolet irradiation, electron irradiation or plasma process on both annular end faces of the second valve 7 and on the surface of the molded rubber 9 before the process to form the thin DLC coating on both end faces of the second valve 7 and on the surface of the molded rubber 9, to improve adhesion performance of the DLC coatings 96, 97 on both end faces of the second valve 7 and on the surface of the molded rubber 9 so that the DLC coatings 96, 97 are not easily fallen off. The hardness of the thin DLC coatings 96, 97, which is formed on both annular end faces of the second valve 7 and on the surface of the molded rubber 9 by the above-described method, is around Hv 50 to Hv 500 in Vickers hardness, in which both abrasion degree and fluid leakage degree satisfy the requirement, as shown in FIG. 7. It is desirable that the hardness of the thin DLC coatings 96, 97, which are formed on both annular end faces of the second valve 7 and on the surface of the molded rubber 9, is around Hv 100 to Hv 200 in Vickers hardness. The thickness of the DLC coatings 96, 97 is 0.40 μm to 1.00 μm.

The coil spring 10 is a valve urging means that generates spring force to urge the second valve 7 in the valve-opening direction, that is, toward one side (the first valve 6 side) in the axial direction. One end of the coil spring 10 is supported by a portion of the molded rubber 9 at the proximity to the rubber seal portion 91, that is, by the valve-side hook of the second valve 7. The other end of the coil spring 10 in the axial direction is supported by a portion of the resin housing 5 at the proximity to the valve seat (the valve seat portion 8), that is, by a housing-side hook that is provided on the inner circumferential portion of wall portion (valve seat) of the resin housing 5. One axial end portion of the coil spring 10 is fitted to an outer circumference of a cylindrical spring inner circumference guide portion 77 that protrudes from the right annular end face (in the drawing) of the second valve 7 to the other side (to the side of the valve hole 43) in the axial direction to the other side in In the following are described actions and effects of the electromagnetic valve 1 according to the first embodiment of the present invention, referring to FIGS. 1 to 7.

When the solenoid coil 3 of the electromagnetic driving portion 2 of the electromagnetic valve 1 is energized, the solenoid coil 3 generates magnetomotive force to magnetize the magnetic plate 25, the stator core 26, the yoke 27 and the moving core 29. Thus, the moving core 29 is attracted to the attracting portion of the stator core 26, so that the first valve 6, which is fixed via the valve shaft 28 to the moving core 29, moves to the one side (leftward in the drawing) in the axial direction against the spring force of the return spring 30 to shrink the bellows 62. While the bellows 62 of the first valve 6 shrinks, the air in the cylindrical space in the bellows 62 of the first valve 6 flows via each the hole of the electromagnetic driving portion 2, the pressure release hole 34, and the hose 37 to the bypass flow passage 23 (or to the fluid passage 44) to move the first valve 6 smoothly in the valve-opening direction.

When the solenoid coil 3 of the electromagnetic driving portion 2 of the electromagnetic valve 1 is energized, the solenoid coil 3 generates magnetomotive force, to magnetize the magnetic plate 25, the stator core 26, the yoke 27 and the moving core 29. Thus, the moving core 29 is attracted to the attracting portion of the stator core 26, so that the first valve 6, which is fixed via the valve shaft 28 to the moving core 29, moves to the one side (left side in the drawing) in the axial direction to reduce a length of the bellows 62, against the spring force of the return spring 30. When the bellows 62 of the first valve 6 is shrunk, the gas in the cylindrical space inside the bellows 62 of the first valve 6 is led through the holes of the electromagnetic driving portion 2, the pressure release hole 34 and the hose 37 to the bypass flow passage 23 (or to the fluid passage 44), so that the first valve 6 smoothly moves in the valve-opening direction.

Accordingly, the resin seal portion 61 of the first valve 6 is lifted off the rubber seat portion 92 of the molded rubber 9, which is mold formed on the second valve 7, to open the communication passage 73, which is formed in the second valve 7. Then, the communication passage 73 of the second valve 7 communicates the fluid passage 41 and the valve chamber 42, which are at upstream side (at the side of the fuel tank 12) with respect to the valve seat of the resin housing 5 in the flow direction of the fluid such as vaporized fuel, with the valve hole 43 and the fluid passage 44, which are at downstream side (at the side of the canister 13) with respect to the valve seat of the resin housing 5 in the flow direction of the fluid such as vaporized fuel. Thus, the pressure at the side of the fuel tank 12 (the pressure in the fluid passage 41 and in the valve chamber 42) gradually decreases to become equal to the pressure at the side of the canister 13 (the pressure in the valve hole 43 and in the fluid passage 44).

In this regard, the valve-opening pressure of the second valve 7 is set based on a relation between pressure-receiving force (the product of seal diameter and pressure acting in the valve-closing direction) that acts on the left annular end face (pressure-receiving face) of the second valve 7, and the spring force of the coil spring 10. Thus, when the pressure at the side of the fuel tank 12, or the pressure in the fluid passage 41 and in the valve chamber 42 decreases to the valve-opening pressure, the spring force of the coil spring 10 moves the second valve 7 to the one side (left side in the drawing) in the axial direction and opens. Accordingly, the rubber seal portion 91 of the molded rubber 9, which is mold formed on the second valve 7, is lifted off the valve seat portion 8 of the resin housing 5, so that the valve hole 43, which is formed on the valve seat of the resin housing 5 completely opens. Then, the fluid such as vaporized fuel, which is vaporized (volatilized) in the fuel tank 12, flows through an upstream side portion of the connection pipe 15 into the electromagnetic valve 1. The fluid such as vaporized fuel further flows from the inlet port via the fluid passage 41, the valve chamber 42, the valve hole 43, the fluid passage 44 and the outlet port into a downstream portion of the connection pipe 15, and is adsorbed by an adsorbent body in the canister 13.

Thus, when the pressure at the side of the fuel tank 12 exceeds a predetermined value (the pressure at the side of the canister 13), a diaphragm of the relief valve 11 is displaced against the spring force of the spring to move a valve shaft connecting the diaphragm with the valve element in the axial direction, so that the valve element is lifted off the valve seat to open the valve hole. When the pressure at the side of the fuel tank 12 is the predetermined value (the pressure at the side of the canister 13) or smaller, the spring force of the spring displaces the diaphragm, so that the valve shaft moves in the axial direction, so that the valve element is seated on the valve seat to close the valve hole. Thus, even when the pressure in the fuel tank 12 increases by vaporized liquid fuel in the fuel tank 12 while the first and second valves 6, 7 of the electromagnetic valve 1 close the valve hole 43, the fluid such as vaporized fuel, which is flown into the electromagnetic valve 1, further flows from the inlet port via the fluid passage 41, the valve chamber 42, the bypass flow passage 22, the valve hole of the relief valve 11, the bypass flow passage 23, the fluid passage 44 and the outlet port to the canister 13. Accordingly, it is possible to prevent the fluid such as vaporized fuel from leaking at pipe connection portions when the pressure in the fuel tank 12 increases.

As described above, in the electromagnetic valve 1 according to the first embodiment of the present invention, the molded rubber 9 is mold formed in the circumferential grooves 71, 72 on both annular end faces of the second valve 7 and in the through hole 75 of the second valve 7. Then, the thin DLC coatings 96, 97 with Vickers hardness of Hv 50 to Hv 500 (desirably Hv 100 to Hv 200) are formed on both annular end faces of the second valve 7 and on the surface of the molded rubber 9 by plasma CVD method, for example. Thus, the DLC coatings 96, 97 have hardness applicable to the rubber seal portion 91 and the rubber seal portion 91 of the second valve 7 that requires fine airtight performance under severely low-temperature condition.

In contrast to the rubber seal portion 91 of the molded rubber 9 having the surface treatment formed from the DLC coating 96, the valve seat of the resin housing 5 is provided with the valve seat portion 8 formed from metallic material such as stainless steel, and the non-adhesive agent 47 is further coated on the surface of the valve seat portion 8. Thus, even when the rubber seal portion 91 of the molded rubber 9 repeats seating on and lifting off the valve seat portion 8 of the resin housing 5, the abrasion degree of the thin DLC coating 96 formed on the surface of the rubber seal portion 91 of the molded rubber 9 is decreased by the non-adhesive effect (lubricating effect) of the non-adhesive agent 47 coated on the surface of the valve seat portion 8 of the resin housing 5.

Accordingly, it is possible to secure the airtight performance at the gap between the rubber seal portion 91 of the molded rubber 9 and the valve seat portion 8 of the resin housing 5 under low-temperature condition and to keep the non-adhesive performance of the DLC coating 96 at the same time. Further, it is possible to secure the airtight performance at the gap between the resin seal portion 61 of the first valve 6 and the rubber seat portion 92 of the molded rubber 9 under low-temperature condition and to keep the non-adhesive performance of the DLC coating 97 at the same time. Furthermore, the anti-abrasion performance and the airtight performance at the gap between the rubber seal portion 91 of the molded rubber 9 and the valve seat of the resin housing 5 even when the rubber seal portion 91 of the molded rubber 9 repeats seating on and lifting off the valve seat portion 8 of the resin housing 5. Thus, it is possible to improve the durability and reliability of the thin DLC coating 96 formed on the surface of the rubber seal portion 91 of the molded rubber 9 of the second valve 7 that requires fine airtight performance under severely low-temperature condition and acts as pressure-sensing valve. In an analogous fashion, the anti-abrasion performance and the airtight performance at the gap between the resin seal portion 61 of the first valve 6 and the valve seat of the second valve 7 even when the resin seal portion 61 of the first valve 6 repeats seating on and lifting off the rubber seat portion 92 of the molded rubber 9. Thus, it is possible to improve the durability and reliability of the thin DLC coating 97 formed on the surface of the rubber seat portion 92 of the molded rubber 9 of the second valve 7.

Further, in the electromagnetic valve 1 according to the first embodiment of the present invention, the inner circumferential face of the cylindrical portion of the resin housing 5 at the side of the electromagnetic driving portion 2 has a toothed shape with protruding portions and depressed portions repeated at regular intervals in the circumferential direction. Thus, it is possible to decrease the contact area between the inner circumferential face of the cylindrical portion of the resin housing 5 at the side of the electromagnetic driving portion 2 and the outer circumferential face (outer diametrical face) of the fitting portion 76 of the second valve 7. As a result, it is possible to greatly decrease the sliding resistance in the relative motion of the cylindrical portion of the resin housing 5 at the side of the electromagnetic driving portion 2 against the fitting portion 76 of the second valve 7. Thus, it is possible to open and close the second valve 7 smoothly, to prevent the second valve from occurring malfunction.

Second Embodiment

Figure 8:
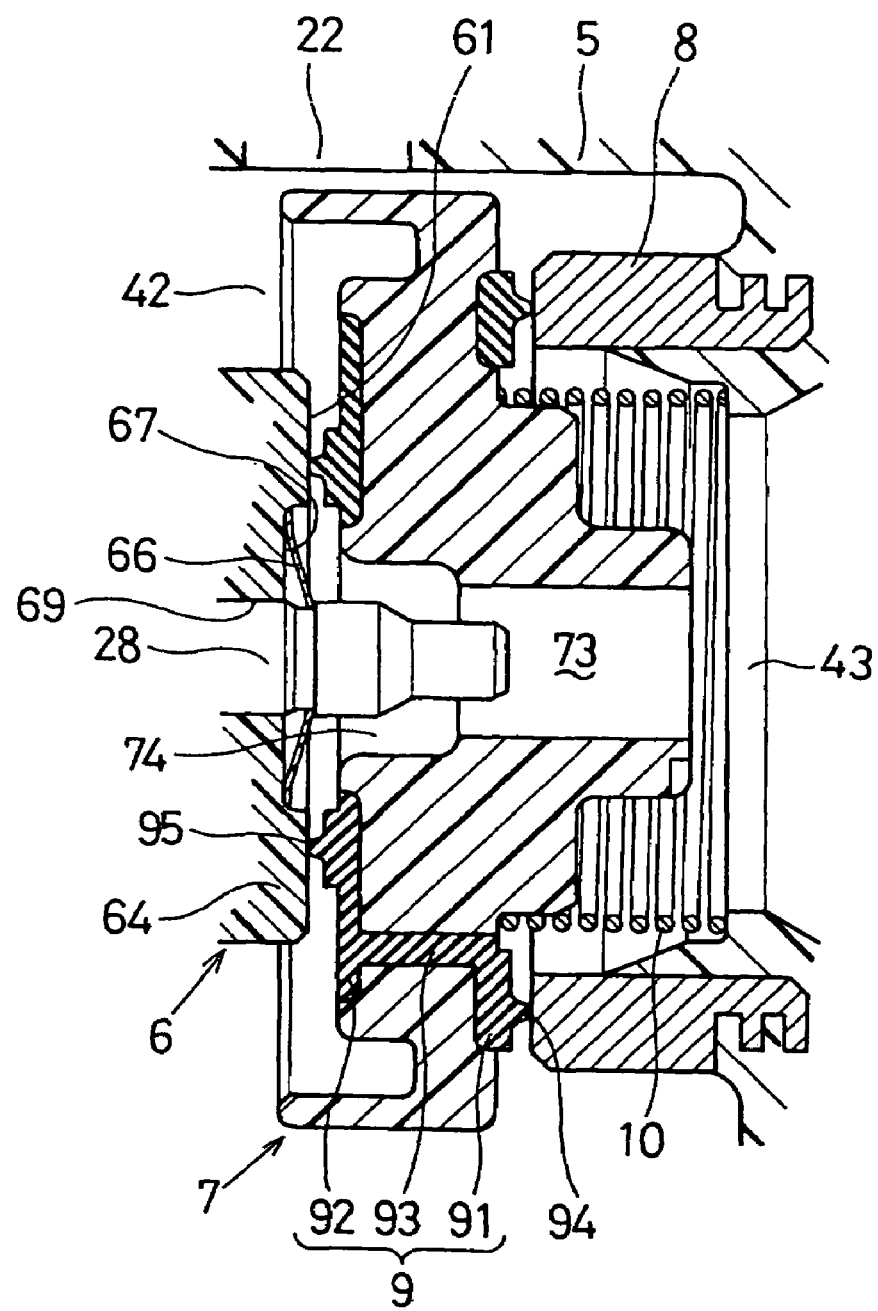
FIG. 8 is a cross-sectional view showing a principal portion of an electromagnetic combination valve according to a second embodiment of the present invention.
Figure 9:
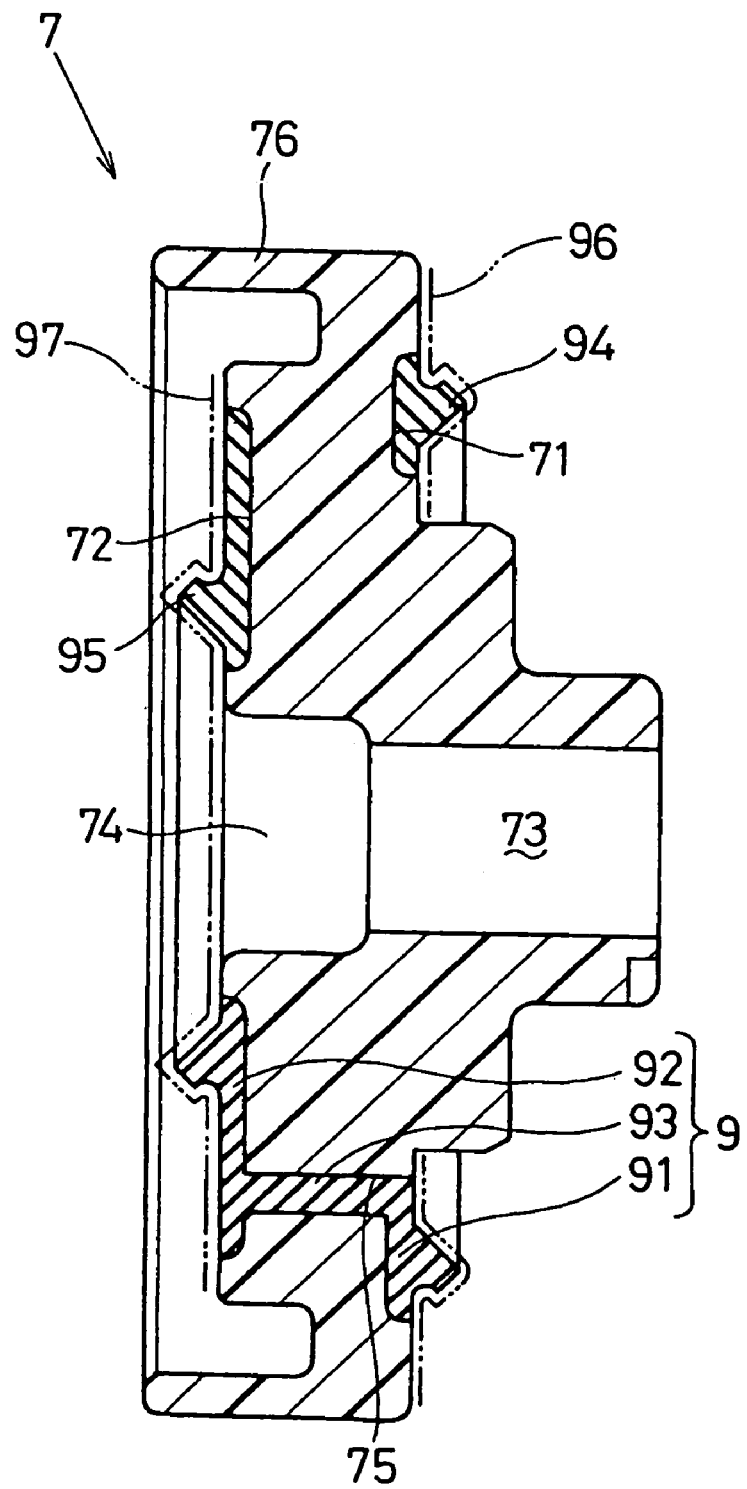
FIG. 9 is a cross-sectional view showing an entire construction of a second valve in the electromagnetic combination valve according to the second embodiment.

A fluid control valve according to a second embodiment of the present invention is described in the following, referring to FIGS. 8 and 9.

In the second embodiment, the thin DLC coating 96 with Vickers hardness of Hv 100 to Hv 200 is formed on the surface of the rubber seal portion 91 of the molded rubber 9, which is mold formed on the right annular end face (in the drawing) of the second valve 7, including the sealing lip portion 94 by plasma CVD method, for example. The DLC coating 96 is formed also on the surface of both the radially outer side and the radially inner side of the rubber seal portion 91 on the right annular end face (in the drawing) of the second valve 7, by plasma CVD method, for example.

Further, in the second embodiment, the thin DLC coating 97 with Vickers hardness of Hv 100 to Hv 200 is formed on the surface of the rubber seat portion 92 of the molded rubber 9, which is mold formed on the left annular end face (in the drawing) of the second valve 7, including the sealing lip portion 95 by plasma CVD method, for example. The DLC coating 97 is formed also on the surface of both the radially outer side and the radially inner side of the rubber seat portion 92 on the left annular end face (in the drawing) of the second valve 7, by plasma CVD method, for example. In the second embodiment, a plurality of the valve guides 53 are not formed.

Third Embodiment

Figure 11:
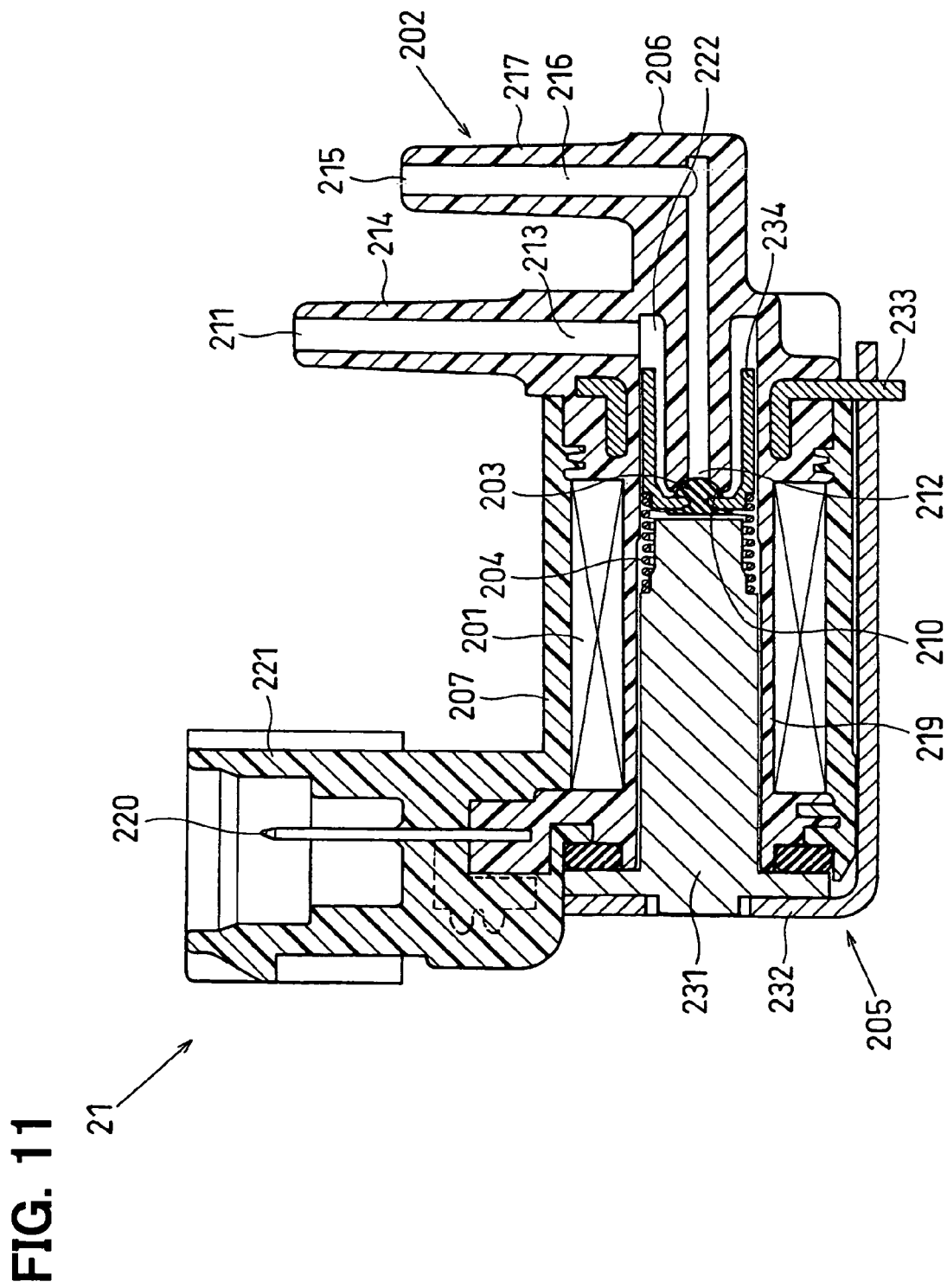
FIG. 11 is a cross-sectional view showing an entire construction of the electromagnetic combination valve according to the third embodiment.
Figure 12:
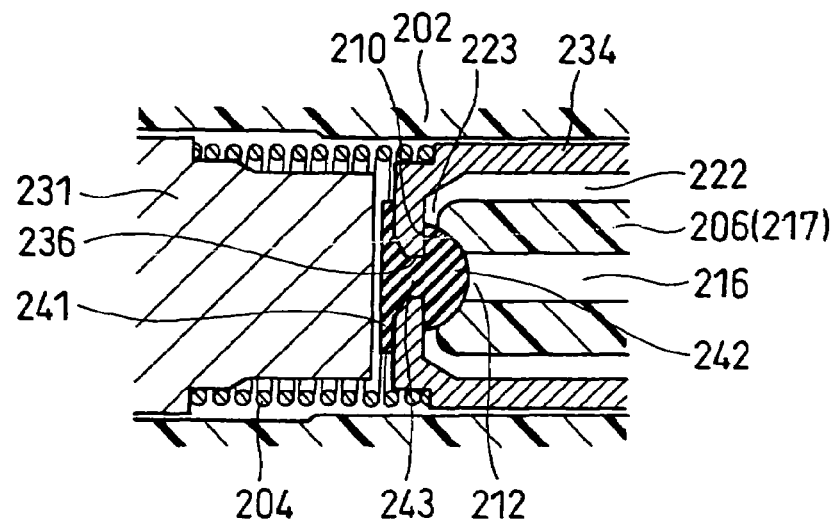
FIG. 12 is a cross-sectional view showing a principal portion pf the electromagnetic combination valve according to the third embodiment.

A fluid control valve (electromagnetic valve) according to a third embodiment of the present invention is described in the following, referring to FIGS. 10 to 12.

In the third embodiment, the electromagnetic valve 21 is incorporated in an evaporative emission control system mounted on a vehicle such as an automobile together with a fluid pressure control valve 40, which is a pressure operated mechanical diaphragm valve. The evaporative emission control system prevents fluid such as vaporized fuel (gasoline vapor, evaporated gas, etc.), which is vaporized or volatilized in a fuel tank 12 of the vehicle, from flying off into the atmosphere by introducing the fluid through a canister 13 into an engine intake pipe 14 of an internal combustion engine (hereinafter referred to as engine) such as a gasoline engine by using negative pressure in the engine intake pipe 14. The evaporative emission control system purges vaporized fuel from emission gas of the engine.

In the evaporative emission control system, a fluid flow pipe (gas flow pipe), which is hereinafter referred to as connection pipe 15, communicates the fuel tank 12 with an evaporated gas port of the canister 13, and another fluid flow pipe (gas flow pipe), which is hereinafter referred to as a connection pipe 16, communicates a purge port of the canister 13 with the engine intake pipe 14.

The connection pipe 15 forms a gas flow passage (purge passage, vaporized fuel flow path) to lead the fluid such as fuel vapor volatilized in the fuel tank 12 via the fluid pressure control valve 40 to the canister 13. The connection pipe 16 forms a gas flow passage (purge passage, vaporized fuel flow path) to lead the fluid such as fuel vapor, which is adsorbed by the canister 13, via an electromagnetic valve 21 to the engine intake pipe 14.

The electromagnetic valve 21 is installed on the way of the connection pipe 16 of the evaporative emission control system, and is a normally-closed electromagnetic fluid flow quantity control valve acting as a purge vacuum switching valve (VSV) to control purge flow amount of the fluid such as the fuel vapor led from the canister 13 to the engine intake pipe 14. An engine control unit (ECU) controls a period to energize a solenoid coil 201 of the electromagnetic valve 21 via an electromagnetic valve driving circuit, to control the purge flow amount of the fluid such as the fuel vapor led from the canister 13 to the engine intake pipe 14. The ECU has a conventional microcomputer therein, and controls a duty ratio, that is, a ratio of turn-on and turn-off period of energization of the solenoid coil 201 of the electromagnetic valve 21.

The electromagnetic valve 21 is provided with: a housing 202, which forms a part of a fluid flow pipe connected to a middle point of the connection pipe 16 of the evaporative emission control system; a rubber valve 203, which is a valve element slidably installed in the housing 202 to open and close as demanded; and a coil spring 204, which applies a spring load to push the rubber valve onto a valve seat of the housing 202. The electromagnetic valve 21 further has the solenoid coil 201, which energizes magnetic attraction force (magnetomotive force) when energized; and a valve driving unit (hereinafter referred to as electromagnetic driving portion) 205, which drives the rubber valve 203 to open by using the magnetic attraction force of the solenoid coil 201.

The housing 202 is integrally formed in a predetermined shape from resinous material such as thermoplastic resin (heat-resistant resin such as PPS, PBT or PA, for example). The housing 202 is formed from a valve seat 206, which slidably installs the rubber valve 203 so that the rubber valve 203 can open and close, and has a valve seat portion 210 onto which the spring load of the coil spring 204 pushes the rubber valve 203, and a coil case 207, which coats and protects the coil assembly including the solenoid coil 201. The valve seat portion 210 is the valve seat portion on which a rubber seal portion 242 of the rubber valve 203, which is described later, can seat in intimate contact fashion. The valve seat portion 210 acts as a restriction face to restrict the operational range of the rubber valve 203 in the axial direction. Thus, when the rubber seal portion 242 of the rubber valve 203 is seated on the valve seat portion 210, the movable parts such as the rubber valve 203 is prevented from moving beyond the restriction surface to the other side (to the valve-closing side) in the axial direction.

In the valve seat 206 are integrally formed: an inlet pipe (inlet-side fluid passage pipe) 214, which forms a L-shaped flow passage 213 that is bent approximately at right angle between a round pipe-shaped inlet port 211 opening at the side of the purge port of the canister 13 and a valve hole 212 that is a passage port opening at the valve seat portion 210; an outlet pipe (outlet-side fluid passage pipe) 217, which forms a L-shaped flow passage 216 that is bent approximately at right angle between the valve hole 212 and an outlet port 215 opening at a confluent portion side of the engine intake pipe 14; and a cylindrical coil bobbin 219 on an outer circumference of which the solenoid coil is wound.

The L-shaped flow passage 216 forms a fluid flow path that communicates the engine intake pipe 14 with the valve hole 212 and extends from the valve seat portion 210 toward the engine intake pipe 14. The coil case 207 is a secondarily formed part that is secondary formed on outer circumferences of the valve seat 206 and the solenoid coil 201, which are primarily formed part. On an outer circumferential portion of the coil case 207 is integrally formed a cylindrical connector shell (male connector portion) 221, which supports a pair of external connection terminals 220 to supply excitation current to the solenoid coil 201.

The electromagnetic driving portion 205 is an electromagnetic actuator that generates magnetic attraction force (magnetomotive force) when an excitation current is applied thereto. The electromagnetic driving portion 205 is formed from: the solenoid coil 201 that generates a magnetic flux thereabout when it is energized; a stator core 231 that is excited by the solenoid coil 201; a stator core such as a yoke 232 and a magnetic plate 233; and a moving core 234 that forms a magnetic circuit together with the solenoid coil 201 and the stator core.

The stator core 231 is formed in a cylindrical shape from magnetic material. The stator core 231 becomes an electromagnet when the solenoid coil 201 is energized, and has an attracting portion at a leading end portion thereof to attract the moving core 234 to one side in the axial direction. The attracting portion also acts as a restriction portion (stopper) that restricts a traveling distance of the movable parts such as the rubber valve 203, the moving core 234 and so on in the axial direction. The stopper is a restriction face that is engaged with the rubber valve 203 or the moving core 234 when the traveling distance (lift amount) of the movable parts such as the rubber valve 203, the moving core 234 and so on to the one side (to the valve-opening side) in the axial direction reaches a full lift amount (maximum lift amount), to prevent the movable parts from moving further to the valve-opening side. In the third embodiment, the fixed core is formed from the stator core 231, the yoke 232, the magnetic plate 233 and so on. However, the fixed core may be formed only from the stator core 231. Further, the fixed core may be formed by combining any one of the yoke 232 and the magnetic plate 233 with the stator core 231.

The moving core 234 is formed in a cup shape (in a cylindrical shape with a bottom) from magnetic material. The moving core 234 becomes an electromagnet when the solenoid coil 201 is energized, and is attracted to the attracting portion of the stator core 231. Further, the moving core 234 also acts as a loading means that makes the spring load of the coil spring 204 push the rubber valve 203 onto the valve seat (valve seat portion) 210 at a periphery of an opening of the valve hole 212 of the outlet pipe 217 of the valve seat 206.

Further, the moving core 234 has a cylindrical portion that is disposed in the cylindrical space 222 forming a part of the L-shaped flow passage 213 formed between the inner circumference of the valve seat 206 (or the inner circumference of the cylindrical portion of the magnetic plate 233) and the outer circumference of the outlet pipe 217 to be slidable in the axial direction. On an annular plate-shaped bottom portion (blocking portion), which is provided on one side (on the stator core-side) of the cylindrical portion in the axial direction, is formed a through hole 236 that penetrates the blocking portion in the axial direction.

The rubber valve 203 is a rubber part formed from rubber elastic body (sealing rubber) such as fluorine rubber, silicone rubber and so on, and integrally fixed to the moving core 234 pf the electromagnetic driving portion 205. The rubber valve 203 is rubber molded (mold formed), rubber printed, baking finished or press-fitted on the blocking portion of the moving core 234. The rubber valve 203 is provided so that it reciprocatingly moves in a round shaped space (valve chamber) 223 formed between the L-shaped flow passage 213 and the valve hole 212 of the outlet pipe 217 in the axial direction. The rubber valve 203 has: a round plate-shaped rubber cushion portion 241 that is provided at left end face (in the drawing) of the blocking portion of the moving core 234 (on one end face of the blocking portion in the axial direction); a rubber seal portion 242 having a hemispherical cross-section that is provided at right end face (in the drawing) of the blocking portion of the moving core 234 (on the other end face of the blocking portion in the axial direction); a rubber filled portion 243 that is fitted to or filled in the through hole 236 of the blocking portion of the moving core 234.

in the third embodiment, the rubber cushion portion 241 of the rubber valve 203 is provided to derive a damper effect to absorb an impact when the rubber valve 230 comes in contact with the stopper (the restriction face) of the stator core 231 and to decrease contact sounds the moving core 234 comes in contact with the stopper of the stator core 231. Further, the surface of the rubber seal portion 242 of the rubber valve 203 has a surface treatment formed from a thin DLC coating (not shown) having fine airtight performance and non-adhesive performance. The DLC coating is a surface treatment coating that also has a fine anti-abrasion performance and small frictional coefficient, and coated on the surface of the rubber seal portion 242 of the rubber valve 203 by CVD method using material gas of hydrocarbon such as methane, ethane, and the like.

The hardness of the thin DLC coating, which is formed on the surface of the rubber seal portion 242 of the rubber valve 203, is around Hv 50 to Hv 500 in Vickers hardness, in which both abrasion degree and fluid leakage degree satisfy the requirement, as in the first embodiment. It is desirable that the hardness of the thin DLC coating, which is formed on the surface of the rubber seal portion 242 of the rubber valve 203, is around Hv 100 to Hv 200 in Vickers hardness. The thickness of the DLC coating is 0.40 μm to 1.00 μm as in the first embodiment.

In the third embodiment, the opening/closing portion of the electromagnetic valve 21 used in the evaporative emission control system is formed from the rubber valve 203, which is a rubber part (rubber elastic body) and the valve seat 206 (especially the outlet pipe 217) of the housing 202, which is a resinous part. However, in the vaporized gasoline, the low molecular constituent (adhesive substance) of additive, which is contained in resinous material (heat-resistant resin) and in rubber material, or and the low molecular constituent (adhesive substance) of additive, which is contained in the resinous material (heat-resistant resin), is easily deposited. Then, depending on a mounting direction of the electromagnetic valve 21 on the vehicle, the adhesive substance drips or falls to be put on a contact portion of the rubber seal portion 242 of the rubber valve 203 and the valve seat portion 210 of the valve seat 206 in a valve-closing time, or accumulated between the rubber seal portion 242 of the rubber valve 203 and the valve seat portion 210 of the valve seat 206. Thus, the adhesive substance makes the rubber seal portion 242 of the rubber valve 203 sticks to the valve seat portion 210 of the valve seat 206, to cause a malfunction or failure.

Then, in the electromagnetic valve 21 according to the third embodiment, the thin DLC coating is formed on the surface of the rubber seal portion 242 of the rubber valve 203. Further, the DLC coating formed on the surface of the rubber seal portion 242 of the rubber valve 203 has hardness of Hv 50 to Hv 500 (desirably Hv 100 to Hv 200) in Vickers hardness. As a result, the hardness of the DLC coating is set in the range suitable for the rubber seal portion 242 of the rubber valve 203 that requires fine airtight performance under severely low-temperature condition. Accordingly, it is possible to secure the airtight performance at the gap between the rubber seal portion 242 of the rubber valve 203 and the valve seat portion 210 of the valve seat 206 under low-temperature condition and to keep the non-adhesive performance of the DLC coating at the same time in the vaporized gasoline. Further, it is possible to secure the airtight performance at the gap between the resin seal portion 61 of the first valve 6 and the rubber seat portion 92 of the molded rubber 9 under low-temperature condition and to keep the non-adhesive performance of the DLC coating 97 at the same. Further, it is possible to improve the anti-abrasion performance and airtight performance at the gap between the rubber seal portion 242 of the rubber valve 203 and the valve seat portion 210 of the valve seat 206. Thus, it is possible to improve the durability and reliability of the thin DLC coating formed on the surface of the rubber seal portion 242 of the rubber valve 203, which requires fine airtight performance under severely low-temperature condition.

Alternatively, the thin DLC coating may be formed on entire surface of the rubber valve 203. The rubber valve 203 may be fixed to the moving core 234 after the thin DLC coating is formed on the entire surface of the rubber valve 203.

Fourth Embodiment

Figure 14:
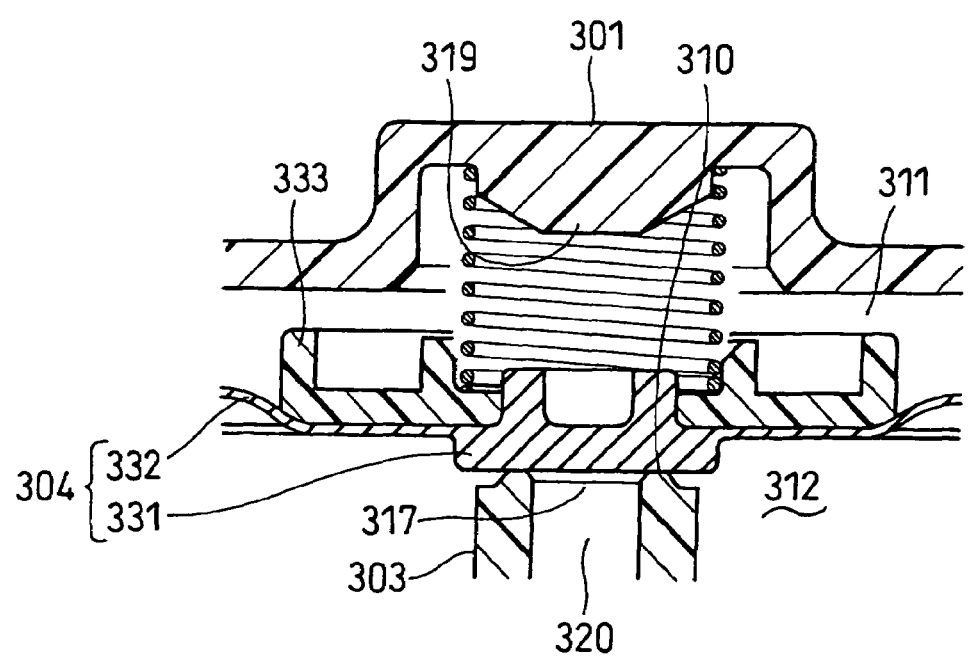
FIG. 14 is a cross-sectional view showing a principal portion pf the electromagnetic combination valve according to the fourth embodiment.
Figure 13:
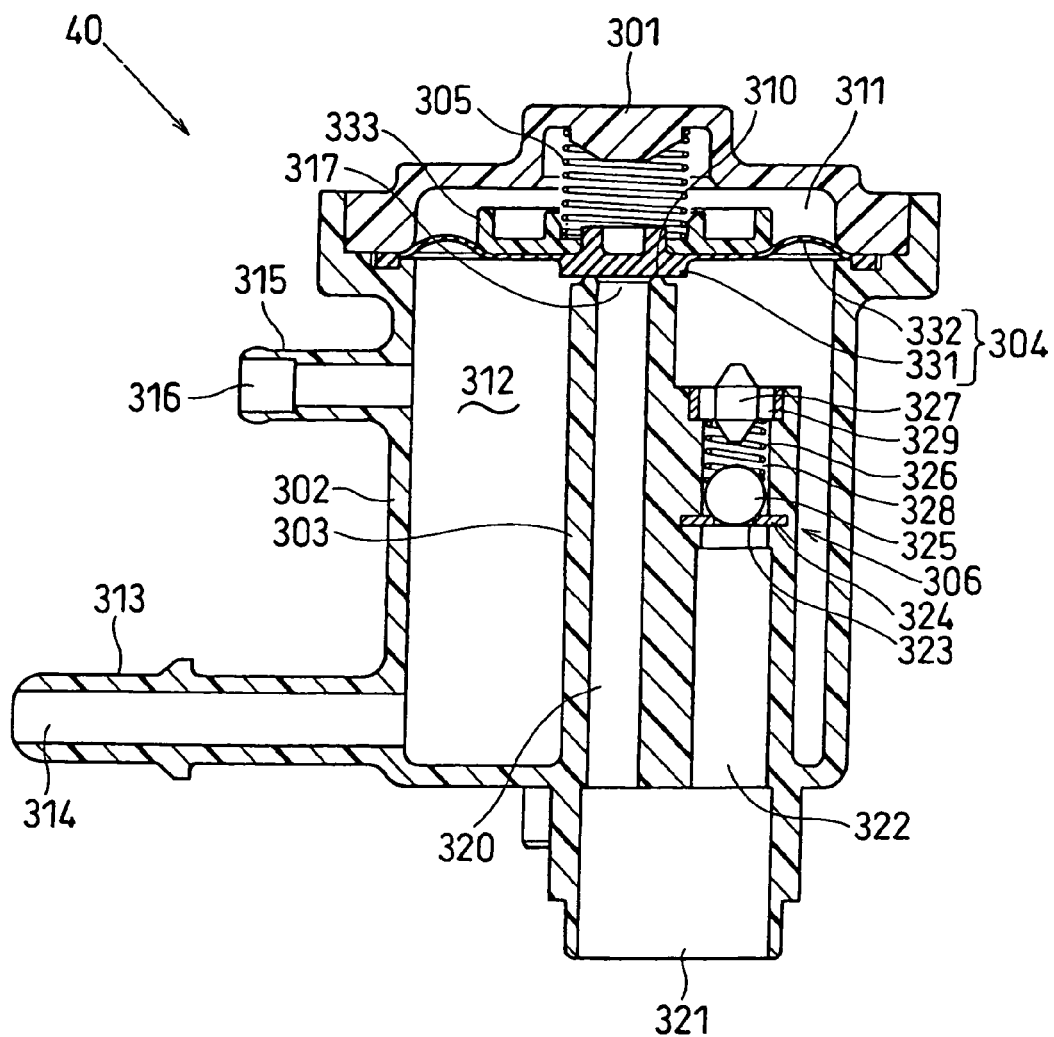
FIG. 13 is a cross-sectional view showing an entire construction of the electromagnetic combination valve according to the fourth embodiment.
Figure 15:
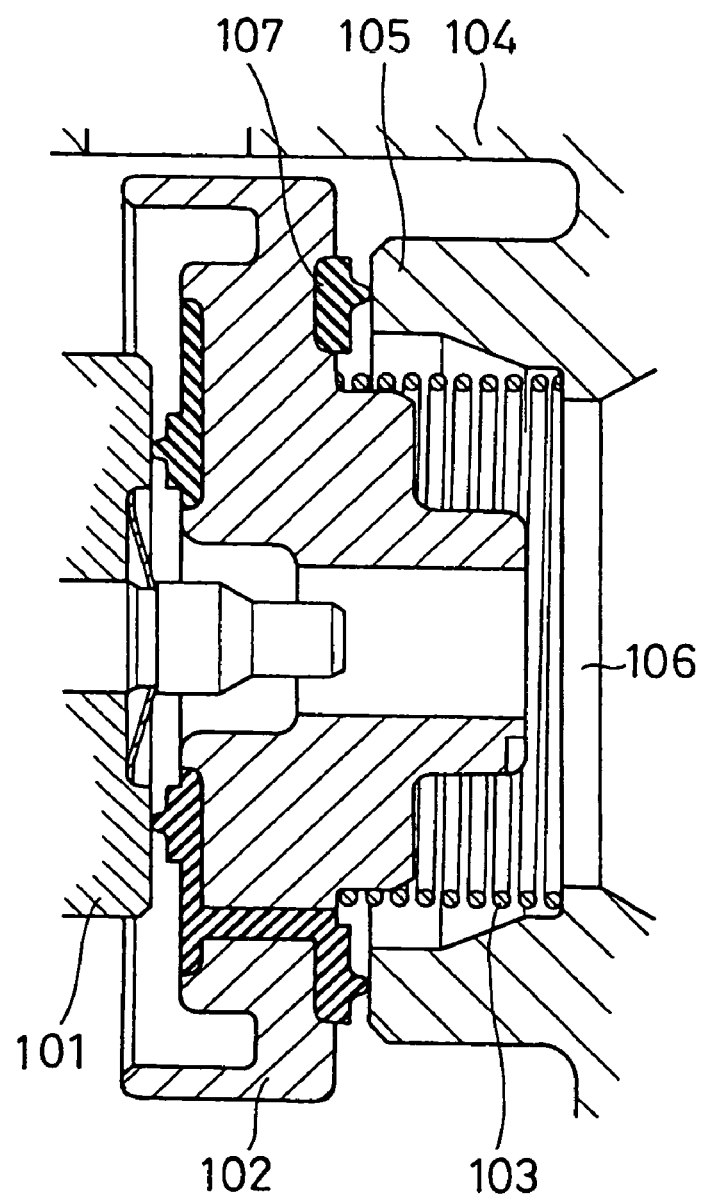
FIG. 15 is a cross-sectional view showing a principal portion of an electromagnetic combination valve as a comparative example.

A fluid control valve according to a fourth embodiment of the present invention is described in the following, referring to FIGS. 13 and 14.

Figure 10:
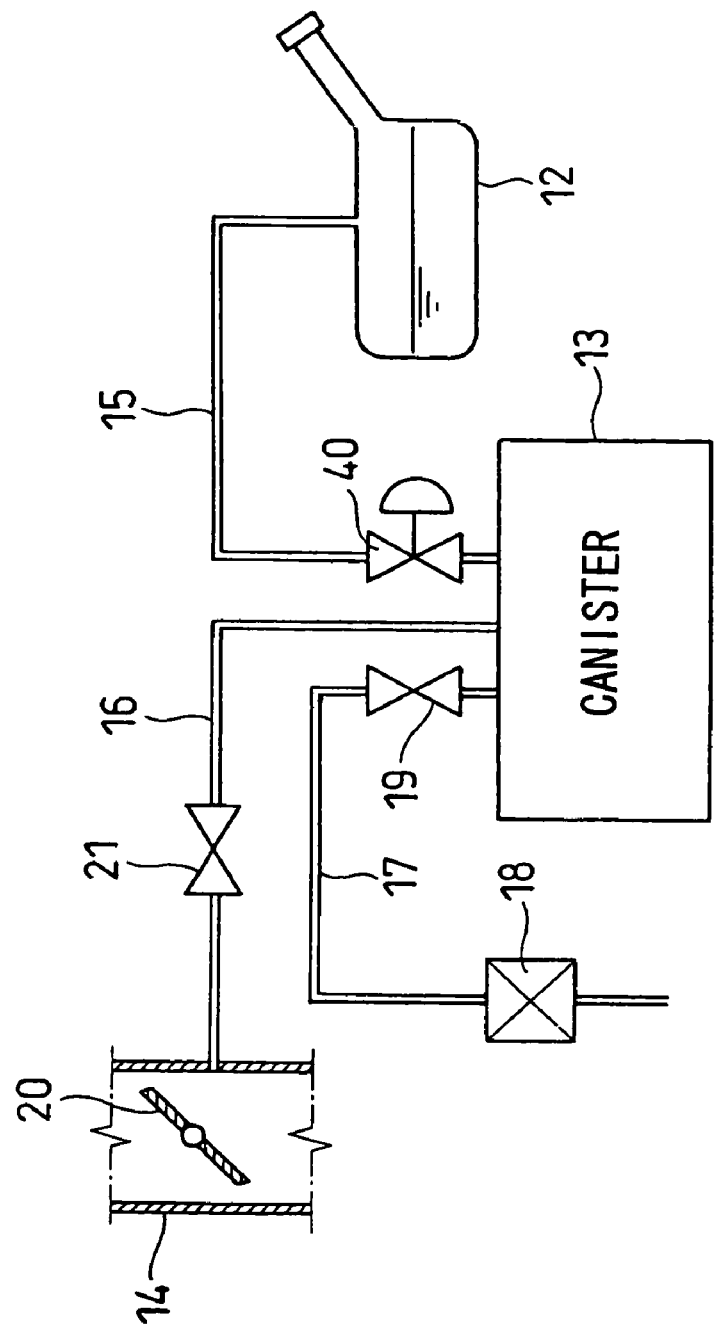
FIG. 10 is a schematic view showing an entire construction of an evaporative emission control system including an electromagnetic combination valve according to a third and fourth embodiments of the present invention.

In the fourth embodiment, as shown in FIG. 10, the fluid pressure control valve 40 is a pressure-operating diaphragm valve that is installed on the way of a connection pipe 15 of the evaporative emission control system to adjust an internal pressure of the fuel tank 12 and an internal pressure of the canister 13 to protect the fuel tank 12 and the canister 13, so that the vaporized fuel is prevented from leaking from the evaporative emission control system. The fluid pressure control valve 40 is a normally-closed pressure-operating valve and provided with: a housing 302 that forms a diaphragm chamber between itself and a resin cover 301; a round pipe-shaped valve seat 303 that is integrally formed with the housing 302; a diaphragm valve 304 that is installed in the housing 302 to open and close freely; and a coil spring (loading means) 305 that applies a spring force to push the diaphragm valve 304 onto the valve seat portion of valve seat 303.

The resin cover 301 is integrally formed from resinous material such as thermoplastic resin (PPS, PBT, PA, and the like). The resin cover 301 is airtightly fixed to the opening side of the housing 302. Then, in the resin cover 301 is formed the first pressure chamber 311, which is partitioned by the diaphragm valve 304. On the ceiling wall of the resin cover 301 is formed a protruding portion 319 that protrudes toward the diaphragm valve 304. The protruding portion 319 also acts as a restriction portion (stopper) to restrict a traveling distance of the diaphragm valve 304 in the axial direction (in the wall thickness direction). The stopper is a restriction face that is engaged with the diaphragm valve 304 when the traveling distance (lift amount) of the diaphragm valve 304 to the one side (upward in the drawing, to the valve-opening side) in the axial direction reaches a full lift amount (maximum lift amount), to prevent the diaphragm valve 304 from moving further to the valve-opening side.

The housing 302 is integrally formed from resinous material such as thermoplastic resin (PPS, PBT, PA, and the like). In the housing 302, a radially outer cylindrical portion and a radially inner cylindrical portion, which is disposed radially inside the outer cylindrical portion, form double pipe. An inner circumference of the outer cylindrical portion and an outer circumference of the valve seat 303 forms a cylindrical second pressure chamber 312 therebetween. The first pressure chamber 311 is communicated with the atmospheric air, and the second pressure chamber 312 is communicated via an inlet port 314, which is a straight fluid passage formed in a round pipe-shaped inlet pipe 313, with an inner space in the fuel tank 12. The second pressure chamber 312 is connected via a sensing port 316, which is formed in a round pipe-shaped communication pipe 315, to an in-tank pressure sensor (not shown) to detect an in-tank pressure in the fuel tank 12.

At the upper end portion (in the drawing) of the valve seat 303 is integrally formed an annular valve seat portion 310 in which a passage port 317 of a fluid passage 320 acting as a valve hole is formed. That is, the valve seat portion 310 is formed at a periphery of an opening of the passage port 317. The valve seat portion 310 is a valve seat portion on which a valve seal portion 331 of the diaphragm valve 304, which is described later, can seat in intimate contact fashion. The valve seat portion 310 is used as a restriction face to restrict a moving range of the diaphragm valve 304 in the axial direction. Thus, when the valve seal portion 331 of the diaphragm valve 304 is seated on the valve seat portion 310, the diaphragm valve 304 is prevented from moving further to the other side (to the valve-closing side) in the axial direction. Further, in the valve seat 303 is formed a fluid passage 320 that communicates the passage port 317 with an vaporized gas port of the canister 13 and extends straightly from the valve seat portion 310 toward an outlet port 321, which opens at the side of the vaporized gas port of the canister 13.

In the fourth embodiment, in the valve seat 303 is formed a fluid passage 322 that is disposed in parallel with the fluid passage 320 including the passage port 317 opened and closed by the diaphragm valve 304 and communicates the second pressure chamber 312 directly with the outlet port 321. At the opening side (upper end side in the drawing) of the fluid passage 322 is formed a relief valve (pressure-adjusting valve) 306 that opens when the pressure at the side of the canister 13 becomes large enough with respect to the pressure at the side of the fuel tank 12. The relief valve 306 is formed from an annular plate-shaped valve seat 324, in which the valve hole 323 is formed, a ball valve 325 that is seated on and lifted off the valve seat 324 to open and close (block) the valve hole 323, a coil spring 326 that applies an spring force to push the ball valve 325 onto the valve seat 324 at a periphery of an opening of the valve hole 323, a stopper 327 that restricts a full lift amount of the ball valve 325, and so on. In the stopper 327 are formed a plurality of communication holes 3229 that communicate the spring chamber 328 with the second pressure chamber 312.

The diaphragm valve 304 is a rubber part formed from rubber elastic body such as fluorine rubber, silicone rubber and the like, and is a rubber valve (sealing rubber) that is seated on and lifted off the valve seat portion 310 of the valve seat 303 to open and close (block) the passage port 317. In the diaphragm valve 304 are integrally formed a valve seal portion 331, which is seated on the valve seat portion 310 of the valve seat 303 in a fully valve-closing time to block the passage port 317, and a thin film-shaped diaphragm portion 332, which is disposed around the valve seal portion 331 to surround the valve seal portion 331 in the circumferential direction. The valve seal portion 331 is provided at a central portion of the annular plate-shaped diaphragm portion 332 to protrude to both sides in a wall thickness direction. The outer peripheral portion of the diaphragm portion 332 is sandwiched between and fixed to a connection portion of the resin cover 301 and a connection portion of the housing 302. The diaphragm valve 304 airtightly partitions the diaphragm chamber into two of a first and a second pressure chambers 311, 312. On an upper end face (in the drawing) of the diaphragm valve 304 is fixed a spring guide 333 to receive the spring load of the coil spring 305.

In the fourth embodiment, the surface of the valve seal portion 331 of the diaphragm valve 304 has a surface treatment formed from thin DLC coating (not shown), which has a smooth surface, thin thickness and highly airtight performance and fine in nonadhesiveness. The DLC coating is a surface treatment coating having fine anti-abrasion performance and a relatively small frictional coefficient, and coated on the surface of the valve seal portion 331 of the diaphragm valve 304 by CVD method in material gas such as methane, ethane and the like. The thin DLC coating formed on the surface of the valve seal portion 331 of the diaphragm valve 304 has hardness around Hv 50 to Hv 500 in Vickers hardness, in which both abrasion degree and fluid leakage degree of the DLC coating satisfy the requirement, as in the first embodiment. It is desirable that the hardness of the thin DLC coating, which is formed on the surface of the valve seal portion 331 of the diaphragm valve 304, is around Hv 100 to Hv 200 in Vickers hardness. The thickness of the DLC coating is 0.40 µm to 1.00 µm as in the first embodiment.

In the following is described an action of the fluid pressure control valve 40 according to the fourth embodiment of the present invention, referring to FIGS. 10, 13 and 14.

In the fluid pressure control valve 40 according to the fourth embodiment, when the pressure at the side of the fuel tank 12 becomes a positive pressure larger than the atmospheric pressure and the pressure in the second pressure chamber 312 becomes large enough with respect to the pressure in the first pressure chamber 311 communicated with the atmospheric air, the diaphragm portion 332 and the valve seal portion 331 is displaced against the spring force of the coil spring 305, so that the valve seal portion 331 of the diaphragm valve 304 is lifted off the valve seat portion 310 of the valve seat 303, to open the passage port 317. Thus, the fuel tank 12 is communicated with the canister 13.

That is, when the temperature around the fuel tank 12 to promote a vaporization of the liquid fuel in the fuel tank 12 to increase the pressure in the fuel tank 12, the fluid such as vaporized fuel, which is flown from the inner space of the fuel tank 12 into the inner space of the fluid pressure control valve 40, further flows from the inlet port 314 via the second pressure chamber 312, the passage port 317, the fluid passage 320, the outlet port 321 to the vaporized gas port of the canister 13. Thus, it is possible to prevent the fluid such as the vaporized fuel from leaking at the pipe connecting portions due to the pressure increase in the fuel tank 12.

Further, in the fluid pressure control valve 40, when the pressure at the side of the fuel tank 12 becomes a negative pressure smaller than the atmospheric pressure, the spring load of the coil spring 305 displaces the diaphragm portion 332 and the valve seal portion 331 to seat the valve seal portion 331 of the diaphragm valve 304 on the valve seat portion 310 of the valve seat 303 in intimate contact fashion, to close the passage port 317. Thus the communication between the fuel tank 12 and the canister 13 is interrupted.

In contrast, in the relief valve 306, in a state that the passage port 317 is closed by the diaphragm valve 304 of the fluid pressure control valve 40, when the pressure at the side of the canister 13 becomes larger than the pressure at the side of the fuel tank 12 (than the pressure in the second pressure chamber 312), the ball valve 325 is lifted off the valve seat 324 against the spring load of the coil spring 326 to open the valve hole 323. Thus, in a case that the pressure in the canister increases when the passage port 317 is closed by the diaphragm valve 304 of the fluid pressure control valve 40, the pressure at the side of the canister 13 is released from the outlet port 321 via the fluid passage 322, the valve hole 323, the spring chamber 328, a plurality of the communication holes 329, the second pressure chamber 312 and the inlet port 314 to the side of the fuel tank 12. Accordingly, it is possible to prevent the fluid such as the vaporized fuel from leaking at the pipe connection portions due to the pressure increase in the canister 13.

In the fluid pressure control valve 40 according to the fourth embodiment of the present invention, the opening/closing portion is composed of the diaphragm valve 304, which is formed from rubber elastic body, and the valve seat 303 of the housing 302, which is formed from resin. In the atmosphere of vaporized gas, the adhesive low molecular constituent of additives contained in heat-resistant resinous material and rubber material or the adhesive low molecular constituent of additives contained in heat-resistant resinous material is easily extracted. Then, the adhesive substances drips or falls depending on the installation direction of the fluid pressure control valve 40 on the vehicle, to be put on the contact portion of the valve seal portion 331 of the diaphragm valve 304 and the valve seat portion 310 of the valve seat 303 in the valve-closing time, or to be accumulated in the gap between the valve seal portion 331 of the diaphragm valve 304 and the valve seat portion 310 of the valve seat 303. As a result, the valve seal portion 331 of the diaphragm valve 304 may be adhered to the valve seat portion 310 of the valve seat 303, to cause a malfunction or failure in the fluid pressure control valve 40.

In this regard, in the fluid pressure control valve 40 according to the fourth embodiment of the present invention, the thin DLC coating is formed on the surface of the valve seal portion 331 of the diaphragm valve 304. Further, the hardness of the thin DLC coating, which is formed on the surface of the valve seal portion 331 of the diaphragm valve 304, is Hv 50 to Hv 500 (desirably Hv 100 to Hv 200) in Vickers hardness, which is applicable to the valve seal portion 331 of the diaphragm valve 304 that requires fine airtight performance under severely low-temperature condition. Accordingly, it is compatibly possible to secure airtight performance at the gap between the valve seal portion 331 of the diaphragm valve 304 and the valve seat portion 310 of the valve seat 303 and to keep non-adhesiveness of the DLC coating in gasoline vapor atmosphere. Further, it is possible to improve anti-abrasion performance and airtight performance at the gap between the valve seal portion 331 of the diaphragm valve 304 and the valve seat portion 310 of the valve seat 303. Accordingly, it is possible to improve durability and reliability of the DLC coating formed on the surface of the valve seal portion 331 of the diaphragm valve 304, which requires fine airtight performance under severely low-temperature condition.

The entire surface of the diaphragm valve 304 may be provided with the thin DLC coating. It is also possible that the thin DLC coating is formed on the entire surface of the diaphragm valve 304 or on the surface of the valve seal portion 331 and then the outer peripheral portion of the diaphragm portion 332 is installed to be sandwiched between the connection portion of the resin cover 301 and the connection portion of the housing 302.

Modified Embodiment

In the above-described embodiments, the electromagnetic valve and the fluid control valve according to the present invention are applied to the electromagnetic valve 1, especially to the electromagnetic tank-sealing valve that is incorporated in the evaporative emission control system of a vehicle such as an automobile. However, the present invention is not limited to these embodiments, and may be adapted to the electromagnetic valves or the fluid control valves used in the auxiliary machines or air conditioning system that are mounted on the vehicle. The present invention is applicable not only to gas fluids such as air and vaporized fuel but also to other gas fluids such as gas-phase refrigerant, liquid fluids such as water, fuel, oil and liquid-phase refrigerant, and two-phase fluids (combination of gas-phase fluid and liquid-phase fluid). Further, in the above-described embodiments, the electromagnetic valve and the fluid control valve according to the present invention are applied to a normally-closed electromagnetic opening/closing valve. However, the electromagnetic valve and the fluid control valve according to the present invention are also applicable to normally-opened electromagnetic opening/closing valves. The electromagnetic valve and the fluid control valve according to the present invention may be configured so that the lift height of the first valve increases or decreases in accordance with an increase of voltage or current applied to the coil.

In the above-described embodiments, a plurality of the valve guides 53 are formed at predetermined intervals (at regular intervals, for example) on the inner circumferential face of the cylindrical portion of the resin housing 5 at the side of the electromagnetic driving portion 2, to guide the second valve 7 to reciprocate in the axial direction. Alternatively, the outer circumferential face (the external diametrical face) of the fitting portion 76 of the second valve 7 may be formed in a gear-like shape to have protruding portions and retracted portions alternatively disposed along the circumferential direction at regular intervals. Further, the internal diametrical face of a plurality of the valve guides 53 and the external diametrical face of the fitting portion 76 of the second valve 7, which slide on each other, may be treated with lubricant, to decrease sliding resistance therebetween. It is desirable to adopt any one of fluorocarbon resin, molybdenum disulfide and DLC for the lubricant.

In the above-described embodiments, the thin DLC coatings 96, 97 having the hardness of Hv 50 to Hv 500 (desirably Hv 100 to Hv 200) in Vickers hardness are formed on both annular end faces (the pressure-receiving face and the opposite face therefrom) of the second valve and on the surface of the molded rubber 9 by using plasma CVD method. Alternatively, thin DLC coating having the hardness of Hv 50 to Hv 500 (desirably Hv 100 to Hv 200) in Vickers hardness may be formed on entire outer surface of the second valve 7 and on the surface of the molded rubber 9.

In the above-described embodiments, the whole of the resin housing 5 is formed from heat-resistant resin, however, it is possible to form the housing 5 so that only a part thereof is formed from resin. For example, a part of the housing 5 may be formed from resin so that the fluid passage 41, which straightly extends from the valve seat of the housing 5 toward the fuel tank 12, and the valve chamber 42 have resin surface. It is also possible that a part of the housing 5 is formed from resin so that the fluid passage 44, which straightly extends from the valve seat of the housing 5 toward the canister 13, has resin surface.

In the above-described third embodiment, the whole of the valve seat 206 of the housing 202 is formed from heat-resistant resin. However, it is possible to form the housing 202 so that only a part (of the valve seat 206) thereof is formed from resin. For example, the housing 202 may be formed so that only the inlet pipe 214 is formed from resin to make the surface of the L-shaped flow passage 213, which turns approximately by right angle on the way from the valve seat portion 210 of the valve seat 206 to the canister 13, a resin one. Only the outlet pipe 217 may be formed from resin to make the surface of the L-shaped flow passage 216, which turns approximately by right angle on the way from the valve seat portion 210 of the valve seat 206 to the engine intake pipe 14, a resin one.

In the above-described fourth embodiment, the whole of the valve seat 303 of the housing 302 is formed from heat-resistant resin, however, it is possible to form the housing 302 so that only a part (of the valve seat 303) thereof is formed from resin. For example, only the radially outer cylindrical portion of the housing 302 or only the inlet pipe 313 may be formed from resin so that the flow passage formed from the second pressure chamber and the inlet port 314, which turns approximately by right angle on the way from the valve seat portion 310 of the valve seat 303 to the fuel tank 12, has resin surface. It is also possible to form only the valve seat 303 from resin so that the flow passage formed from the fluid passage 320 and the outlet port 321, which straightly extends from the valve seat portion 310 of the valve seat 303 toward the canister 13, has resin surface.

In the above-described embodiments, the electromagnetic valve and the fluid control valve according to the present invention are applied to the electromagnetic tank-sealing valve 1, the electromagnetic purge vacuum switching valve (VSV) 21, which is a normally-closed electromagnetic flow quantity control valve, and the fluid pressure control valve 40, which is a mechanical pressure-operated valve, that are incorporated in the evaporative emission control system of a vehicle such as an automobile. The electromagnetic valve and the fluid control valve according to the present invention are not limited to these, and may be applied, for example, to an electric air pump-integrated two position three-way switching valve, which is incorporated in the evaporative emission control system as a leakage detection unit thereof the evaporative emission control system.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid control valve comprising:
    a housing in which a fluid passage is formed and at least a part of which is formed from resinous material;
    a valve seat in which a fluid flow hole is formed to be communicated with the fluid passage; and
    a valve that is formed from rubber elastic body, has a valve seal portion and is installed in the housing to be able to close the fluid flow hole so that the valve seal portion is seated on the valve seat and to open the fluid flow hole so that the valve seal portion is lifted off the valve seat, the valve seal portion being coated by a thin diamond-like carbon coating having a hardness between Hv 50 and Hv 500 in Vickers hardness.

2. The fluid control valve according to claim 1, wherein the valve seat has a valve seat portion on which the valve seal portion of the valve comes seated in an intimate contact state at a periphery of an opening of the fluid flow hole.

3. A fluid control valve comprising:
a housing in which a fluid passage is formed and at least a part of which is formed from resinous material;
a valve seat in which a fluid flow hole is formed to be communicated with the fluid passage;
a sealing rubber that is formed from rubber elastic body and has a rubber seal portion, the rubber seal portion being coated by a thin diamond-like carbon coating having a hardness between Hv 50 and Hv 500 in Vickers hardness; and
a valve on which the sealing rubber is disposed and that is installed in the housing to be able to close the fluid flow hole by seating on the valve seat so that the rubber seal portion seals a gap between the valve seat and the valve and to open the fluid flow hole by being lifted off the valve seat.

4. The fluid control valve according to claim 3, wherein the valve seat has a valve seat portion on which the rubber seal portion of the sealing rubber comes seated in an intimate contact state at a periphery of an opening of the fluid flow hole.

5. The fluid control valve according to claim 1, further comprising:
an electromagnetic driving portion having a coil that generates a magnetomotive force when energized to drive the valve to open the fluid flow hole; and
a spring that urges the valve to close the fluid flow hole.

6. The fluid control valve according to claim 1, further comprising:
an electromagnetic driving portion having a diaphragm that generates a displacement in accordance with a pressure difference between two pressure chambers and drives the valve to open the fluid flow hole by using the displacement; and
a spring that urges the valve to close the fluid flow hole.

7. The fluid control valve according to claim 1, wherein:
the valve acts as a fluid flow amount control valve installed in an evaporative emission control system that leads vaporized fuel volatilized in a fuel tank via a canister to an intake pipe of an internal combustion engine.

8. The fluid control valve according to claim 1, wherein:
the valve acts as a fluid pressure control valve installed in an evaporative emission control system that leads vaporized fuel volatilized in a fuel tank via a canister to an intake pipe of an internal combustion engine.

9. The fluid control valve according to claim 1, wherein:
the valve acts as a pressure-operated valve installed in an evaporative emission control system that leads vaporized fuel volatilized in a fuel tank via a canister to an intake pipe of an internal combustion engine.

10. The fluid control valve according to claim 1, wherein a part of the housing formed from resinous material includes inner surface layer portion of the fluid passage.

11. An electromagnetic combination valve comprising:
an electromagnetic driving portion having a coil that generates a magnetomotive force when it is energized;
a housing at least a part of which is formed from resinous material and that has a valve seat formed in an approximately cylindrical shape in which a fluid passage hole is formed;
a spring that generates an urging force in an axial direction of the housing;
a first valve that is installed in the housing to be slidable in the axial direction to be opened by being attracted to one side in the axial direction by the magnetomotive force generated by the coil; and
a second valve that is installed in the housing to be slidable in the axial direction to be seated on the valve seat of the housing by being sandwiched between the valve seat of the housing and the first valve and to be opened by being urged to the one side in the axial direction by the urging force of the spring when a pressure to urge the second valve to close the second valve decreases to a predetermined value in a condition that the first valve is opened, the second valve having a sealing rubber on an end face thereof to face the valve seat of the housing to be able to seat on the valve seat of the housing, the sealing rubber being coated by a thin diamond-like carbon coating having a hardness between Hv 50 and Hv 500 in Vickers hardness.

12. The electromagnetic combination valve according to claim 11, wherein the valve seat has a valve seat portion that is formed from metallic material and on which the sealing rubber of the second valve comes seated to close the fluid passage hole; and
non-adhesive agent is put on a surface of valve seat portion to improve an anti-abrasion performance of the surface.

13. The electromagnetic combination valve according to claim 12, wherein:
the housing has a valve chamber that is formed between electromagnetic driving portion and the valve seat to install the first valve and the second valve therein and a fluid passage at a fluid downstream side of the valve chamber; and
the valve seat of the housing is integrally formed on a cylindrical wall portion that protrudes from an end face of a ring-shaped partition wall partitioning the valve chamber and the fluid passage from each other toward the electromagnetic driving portion so that the valve seat portion of the valve seat is insert molded in the cylindrical wall portion.

14. The electromagnetic combination valve according to claim 11, wherein the second valve has a communication passage that penetrates therethrough in the axial direction and a sealing rubber on an end face thereof to face the first valve to be able to seat the first valve thereon to close the communication passage.

15. The electromagnetic combination valve according to claim 11, wherein the sealing rubber is rubber printed or rubber molded on the end face of the second valve.

16. The electromagnetic combination valve according to claim 11, wherein the first valve and the second valve acts as an electromagnetic tank-sealing valve installed in an evaporative emission control system that leads vaporized fuel volatilized in a fuel tank via a canister to an intake pipe of an internal combustion engine.

17. The electromagnetic combination valve according to claim 16, wherein a fluid passage is formed in the housing to communicate fluid passage hole with any one of the fuel tank, the canister and the intake pipe of the internal combustion engine to extend from the valve seat of the housing toward the fuel tank, the canister or the intake pipe of the internal combustion engine.

* * * * *